(12) United States Patent
Sawada et al.

(10) Patent No.: US 9,062,199 B2
(45) Date of Patent: *Jun. 23, 2015

(54) MOLDED PRODUCT COMPOSED OF POLYESTER RESIN COMPOSITION

(71) Applicant: KAO CORPORATION, Tokyo (JP)

(72) Inventors: Hiroki Sawada, Wakayama (JP); Shigehisa Kamimura, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/375,613

(22) PCT Filed: Feb. 7, 2013

(86) PCT No.: PCT/JP2013/052831
§ 371 (c)(1),
(2) Date: Jul. 30, 2014

(87) PCT Pub. No.: WO2013/125359
PCT Pub. Date: Aug. 29, 2013

(65) Prior Publication Data
US 2015/0018468 A1 Jan. 15, 2015

(30) Foreign Application Priority Data

Feb. 22, 2012 (JP) ................................ 2012-036593
Feb. 22, 2012 (JP) ................................ 2012-036594
Feb. 22, 2012 (JP) ................................ 2012-036595
Aug. 8, 2012 (JP) ................................ 2012-176193

(51) Int. Cl.
*C08L 67/02* (2006.01)
*C08J 5/18* (2006.01)
(Continued)

(52) U.S. Cl.
CPC .. *C08L 67/02* (2013.01); *C08J 5/00* (2013.01); *C08J 7/00* (2013.01); *C08K 5/11* (2013.01);
(Continued)

(58) Field of Classification Search
CPC ................ C08L 67/02; C08J 5/00; C08J 7/00
USPC ................ 524/308, 311, 223; 264/211.1, 291
See application file for complete search history.

(56) References Cited

U.S. PATENT DOCUMENTS 6,544,607 B1 4/2003 Kuroki et al.
8,722,813 B2 * 5/2014 Sawada et al. ................ 525/418
(Continued)

FOREIGN PATENT DOCUMENTS

JP 7-118513 A 5/1995
JP 10-36651 A 2/1998
(Continued)

OTHER PUBLICATIONS

International Search Report dated Apr. 9, 2013 for International Application No. PCT/JP2013/052831.

*Primary Examiner* — John Uselding
(74) *Attorney, Agent, or Firm* — Birch, Stewart, Kolasch & Birch, LLP

(57) ABSTRACT

A molded article selected from the group consisting of (1) a sheet or a film, (2) a thermoformed article, (3) a stretched film, wherein the molded article is made of a polyester resin composition containing a polyester resin and a polyester-based plasticizer represented by the following formula (I): $R^1O-CO-R^2-CO-[(OR^3)_mO-CO-R^2-CO-]_nOR^1$ (I), wherein $R^1$ is an alkyl group having from 1 to 4 carbon atoms, $R^2$ is an alkylene group having from 2 to 4 carbon atoms, $R^3$ is an alkylene group having from 2 to 6 carbon atoms, m is the number of from 1 to 6, and n is the number of from 1 to 12, with proviso that all the $R^2$'s may be identical or different, and that all the $R^3$'s may be identical or different. The molded article of the present invention can be, for example, suitably used, such as a sheet or film for use in various industrial applications in foods, agriculture, and industries, a thermoformed article for use in various applications such as food containers, wrapping materials for daily sundries and household electric appliances, and industrial trays of industrial parts, and a stretched film for use in various applications such as wrapping materials for food wrappings, daily sundries, and household electric appliances, and various industrial films, respectively.

20 Claims, 1 Drawing Sheet

PILED VIEW
(CROSS-SECTIONAL VIEW)

VACUUM-FORMED ARTICLE (CUP-SHAPED)

(51) Int. Cl.
*C08L 67/04* (2006.01)
*C08J 5/00* (2006.01)
*C08J 7/00* (2006.01)
*C08K 5/11* (2006.01)
*B29C 47/00* (2006.01)
*B29C 51/02* (2006.01)
*C08K 5/20* (2006.01)
*B29K 67/00* (2006.01)
*B29K 105/00* (2006.01)
*B29L 7/00* (2006.01)

(52) U.S. Cl.
CPC ... *C08K 5/20* (2013.01); *C08J 5/18* (2013.01); *C08J 2367/02* (2013.01); *C08L 67/04* (2013.01); *B29C 47/0054* (2013.01); *B29C 51/02* (2013.01); *B29K 2067/046* (2013.01); *B29K 2105/0038* (2013.01); *B29K 2105/256* (2013.01); *B29K 2995/004* (2013.01); *B29L 2007/008* (2013.01); *C08J 2367/04* (2013.01); *C08J 2467/02* (2013.01)

(56) References Cited

U.S. PATENT DOCUMENTS

2009/0311511 A1  12/2009  Obuchi et al.
2013/0137802 A1   5/2013  Sawada et al.

FOREIGN PATENT DOCUMENTS

| JP | 2000-302956 A | 10/2000 |
| JP | 2002-60605 A | 2/2002 |
| JP | 2005-23091 A | 1/2005 |
| JP | 2007-130893 A | 5/2007 |
| JP | 2007-130895 A | 5/2007 |
| JP | 2007-314751 A | 12/2007 |
| JP | 2009-62410 A | 3/2009 |
| JP | 2011-153296 A | 8/2011 |
| WO | 2006/121056 A1 | 11/2006 |
| WO | WO 2012/023589 A1 | 2/2012 |

* cited by examiner

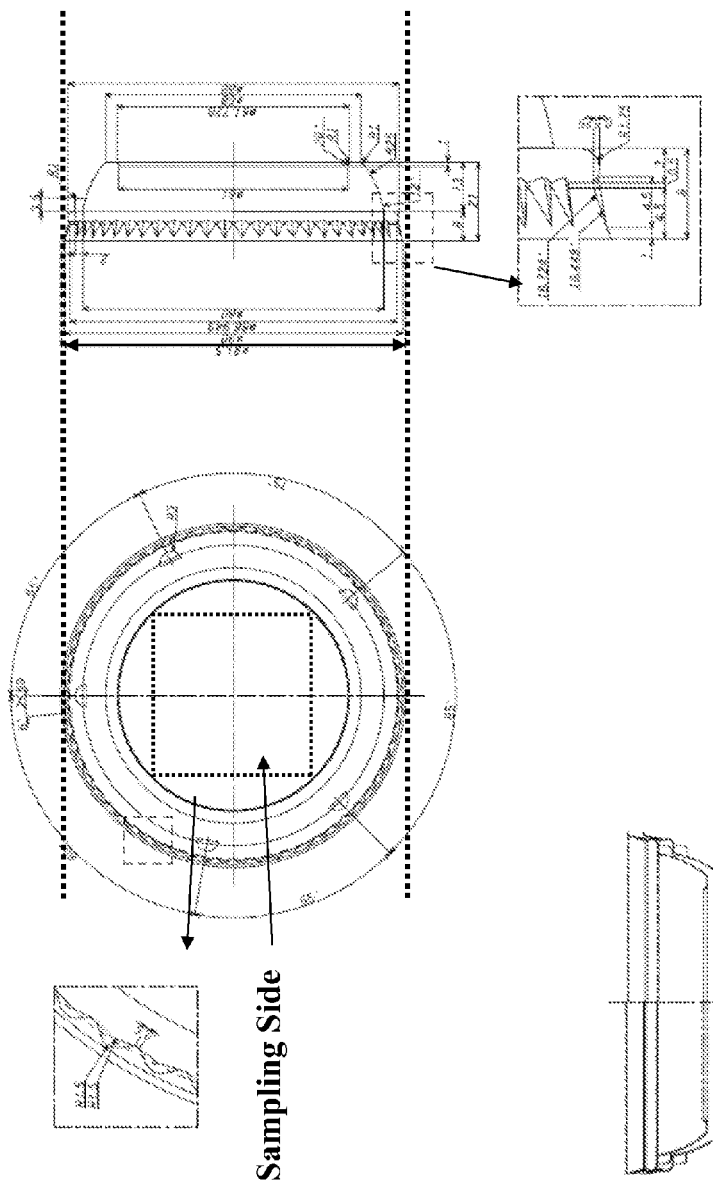

MOLDED PRODUCT COMPOSED OF POLYESTER RESIN COMPOSITION

FIELD OF THE INVENTION

The present invention relates to a molded article made of a polyester resin composition. More specifically, the present invention relates to a molded article made of a polyester resin composition which can be suitably used in daily sundries, household electric appliance parts, food containers, and the like, and a method for producing the molded article.

BACKGROUND OF THE INVENTION

Biodegradable resins begin to degrade in several weeks by actions of enzymes produced by microorganisms living in nature in a case where the biodegradable resins are placed in soil, sea waters, or inside the body of animals, and disappear during a period of about an year to several years. Therefore, in recent years, utilization of the resins is being remarked from the viewpoint of increased interests in environmental-friendliness.

For example, Patent Publication 1 discloses that when a polyester-based plasticizer having a repeating unit of a divalent alcohol, terminals of which are capped with a monobasic acid and/or a monohydric alcohol, the polyester-based plasticizer having a total of acid value and hydroxyl value of 40 or less, is used, the polyester-based plasticizer has excellent compatibility with the polymer, whereby a resin composition having excellent water resistance and flexibility while maintaining transparency of a lactic acid-based polymer is obtained.

In Patent Publication 2, it is reported that a resin composition having excellent flexibility and storage stability is obtained by melt-kneading a lactic acid-based polyester previously subjected to deactivation treatment of a polymerization catalyst with a chelating agent and/or an acidic phosphoric ester, with a plasticizer, and that a molded article having excellent heat resistance and solvent resistance is obtained by molding and crystallizing the composition.

In Patent Publication 3, an amorphous sheet obtained by extruding a polylactic acid composition containing a polylactic acid resin, a plasticizer, and a crystal nucleating agent in a molten state is rapidly quenched to solidify a crystal nucleating agent, and thereafter an extruded mixture is heated to crystallize, whereby a polylactic acid resin sheet having excellent heat resistance and printability is obtained.

In addition, in Patent Publication 4, it is reported that when a molded article obtained by vacuum molding, pressure molding or vacuum pressure molding a resin composition prepared by blending an aliphatic polyester with a particular (poly)glycerol ester-based plasticizer has an appropriate softness, and is allowed to pierce though a hole or the like, the cutting edges are clean and cracking does not take place therefrom, and a plasticizer used is not eluted into water, so that the molded article does not cause bleed-out even at high temperatures, and has high heat resistance.

Patent Publication 5 discloses that a sheet made of a lactic acid-based polymer composition prepared by blending a lactic acid-based polymer with an organic crystal nucleating agent containing an aliphatic carboxylic acid amide having an amide bond, and a crystallization promoter, such as a phthalic acid derivative, an isophthalic acid derivative, an adipic acid derivative, a maleic acid derivative, a citric acid derivative, an itaconic acid derivative, an oleic acid derivative, a ricinoleic acid derivative, a phosphate ester, a hydroxypolycarboxylic acid ester, or a polyhydric alcohol ester, is treated to have a crystallinity of from 20 to 50%, and thereafter subjected to a secondary molding, thereby obtaining a thermoformed article having excellent heat resistance and transparency at excellent production efficiency.

In addition, in Patent Publication 6, it is reported that a composition prepared by blending an aliphatic polyester with a particular (poly)glycerol ester-based plasticizer shows inhibition of bleed-out of the plasticizer, so that the composition is suitable as raw materials for a molded article such as a film having excellent transparency, heat resistance, and flexibility. In addition, as the film, a stretched film having a crystallinity of from 20 to 60% is disclosed.

In Patent Publication 7, in a resin composition prepared by blending a composition containing a polylactic acid resin and a flame retardant with a cellulose having a crystallinity of less than 50%, an example where an oligoester-based plasticizer is further blended is disclosed. A molded article obtained by injection-molding the above resin composition shows excellent strength, flexibility, impact resistance, and flame retardant property.

PRIOR ART REFERENCES

Patent Publications

Patent Publication 1: Japanese Patent Laid-Open No. Hei-7-118513
Patent Publication 2: Japanese Patent Laid-Open No. Hei-10-36651
Patent Publication 3: Japanese Patent Laid-Open No. 2009-62410
Patent Publication 4: Japanese Patent Laid-Open No. 2002-60605
Patent Publication 5: WO 2006-121056
Patent Publication 6: Japanese Patent Laid-Open No. 2000-302956
Patent Publication 7: Japanese Patent Laid-Open No. 2011-153296

SUMMARY OF THE INVENTION

The present invention relates to the following [1] to [8]:
[1] a molded article selected from the group consisting of (1) a sheet or a film, (2) a thermoformed article, (3) a stretched film, wherein the molded article is made of a polyester resin composition containing a polyester resin and a polyester-based plasticizer represented by the following formula (I):

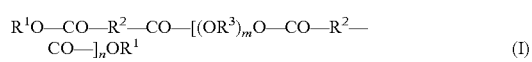

$$R^1O-CO-R^2-CO-[(OR^3)_mO-CO-R^2-CO-]_nOR^1 \quad (I)$$

wherein $R^1$ is an alkyl group having from 1 to 4 carbon atoms, $R^2$ is an alkylene group having from 2 to 4 carbon atoms, $R^3$ is an alkylene group having from 2 to 6 carbon atoms, m is the number of from 1 to 6, and n is the number of from 1 to 12, with proviso that all the $R^2$'s may be identical or different, and that all the $R^3$'s may be identical or different;
[2] a method for producing a molded article as defined in the above [1], characterized in that the method includes the following step (1):
step (1): cooling a sheet or a film obtained by extruding a polyester resin composition containing a polyester resin and a polyester-based plasticizer represented by the formula (I) from a die according to an extrusion molding method to a temperature lower than a glass transition temperature (Tg) of the polyester resin composition, to provide a sheet or a film having a relative crystallinity of less than 80%;

[3] the method for producing a molded article according to the above [2], further including the following step (2-1):

step (2-1): heating a sheet or a film obtained in the step (1) to a temperature of equal to or higher than a glass transition temperature (Tg) of the polyester resin composition and lower than a melting point (Tm) of the polyester resin composition, to provide a crystallized sheet or film having a relative crystallinity of 80% or more;

[4] the method for producing a molded article according to the above [2], further including the following step (2-2):

step (2-2): thermoforming a sheet obtained in the step (1) within a temperature range of equal to or higher than a glass transition temperature (Tg) of the polyester resin composition and lower than a melting point (Tm) of the polyester resin composition, to provide a crystallized thermoformed article having a relative crystallinity of 80% or more;

[5] the method for producing a molded article according to the above [2], further including the following step (2-3):

step (2-3): subjecting a sheet obtained in the step (1) to uniaxial stretching or biaxial stretching within a temperature range of equal to or higher than a glass transition temperature (Tg) of the polyester resin composition and equal to or lower than a cold crystallization temperature (Tc) of the polyester resin composition, to provide a crystallized stretched film having a relative crystallinity of 80% or more;

[6] use of a molded article as defined in the above [1], in the manufacture of (1) wrapping containers selected from the group consisting of clear cases for manufactured articles selected from daily sundries, cosmetics, and household electric appliances, and transparent windows of paper boxes, or (2) stationeries selected from clear plastic holders and ID card cases;

[7] use of a molded article as defined in the above [1], in the manufacture of (1) blister packs or trays for manufactured articles selected from daily sundries, cosmetics, and household electric appliances; (2) food containers; or (3) industrial trays used in transportation or protection of industrial parts; and

[8] use of a molded article as defined in the above [1], in the manufacture of (1) wrapping materials for manufactured articles selected from daily sundries, cosmetics, and household electric appliances; (2) industrial films, or (3) films for food wrapping.

BRIEF DESCRIPTION OF THE DRAWINGS

FIG. 1 shows a mold used when a thermoformed article of Examples is prepared.

DETAILED DESCRIPTION OF THE INVENTION

According to the prior art, it is possible to obtain a molded article such as a sheet or a film having excellent heat resistance, a thermoformed article having excellent heat resistance, transparency, and bleeding resistance, or a stretched film having excellent strength, flexibility, transparency, and bleeding resistance by preparing a resin composition having increased compatibility between the components by blending a particular plasticizer, or having thermal degradation of the resin inhibited by previously treating the resin itself, and crystallizing the resin composition. However, its transparency is not sufficient, and crystallinity is not yet sufficient so that the strength is worsened, whereby the applicable uses are limited.

The present invention relates to a sheet or a film made of a polyester resin composition, capable of being obtained in excellent operability, and having excellent transparency and having excellent heat resistance and bleed resistance, and a method for production thereof.

The present invention relates to a thermoformed article made of a polyester resin composition having a high crystallinity, and having excellent transparency, heat resistance, bleeding resistance, and strength, and a method for production thereof.

The present invention relates to a stretched film made of a polyester resin composition having a high crystallinity, and having excellent transparency, bleeding resistance, and strength, and a method for production thereof.

The sheet or film of the present invention exhibits some excellent effects of being capable of obtaining in excellent operability, and having excellent transparency and excellent heat resistance and bleeding resistance.

The thermoformed article of the present invention exhibits some excellent effects of having a high crystallinity, and having excellent transparency, heat resistance, bleeding resistance, and strength.

The stretched film of the present invention exhibits some excellent effects of having a high crystallinity, and having excellent transparency, bleeding resistance, and strength.

The molded article of the present invention is made of a polyester resin composition containing a polyester resin and a polyester-based plasticizer, which has a feature in that the plasticizer is a particular compound. Specific embodiments of the molded article of the present invention include (1) a sheet or a film, (2) a thermoformed article, and (3) a stretched film.

In general, polyester-based plasticizers are mostly polymer compounds having high acid value and hydroxyl value. When a polyester resin is blended with the above compound, the polyester resin is degraded by an acid group, for example, a carboxyl group, or a hydroxyl group of the compound, or bleed-out takes place, so that the plasticizer itself is degraded. Therefore, when a resin composition obtained is heated to be molded, transparency of the molded article is likely to be lowered. In view of the above, in the present invention, a compound represented by the above formula (I) is used. The compound has small numbers of acid groups or hydroxyl groups, and a terminal of the compound is capped, so that the reactivity with the polyester resin is low, whereby the degradation of the polyester resin is inhibited. In addition, since the compound has an acyclic structure in which each segment in the molecule has appropriate polarity, appropriate interactions with the polyester resin are obtained, so that the compatibility with the polyester resin is improved.

For this reason, a polyester resin composition blended with the compound has improved plasticity, and at the same time a molded article obtained by molding a resin composition obtained into, for example, a sheet or a film, has excellent transparency, and has excellent bleeding resistance of the plasticizer. In addition, as compared to a dibasic acid ester made from a monoalkyl ether of a polyalkylene glycol and a dibasic acid, the polyester resin composition has a lower content ratio of ether groups as a polar group, and has excellent oxidation stability and volatile resistance, so that fumes from an extruder during extrusion molding are inhibited, thereby making operability excellent, and at the same time improving heat resistance of the molded article.

In addition, a polyester resin composition blended with the compound has improved plasticity and moldability (wider moldable temperature range during thermoforming), and at the same time a thermoformed article obtained by a secondary processing treatment (thermoforming) has excellent bleeding resistance of the plasticizer, so that the thermoformed article has excellent transparency, and has excellent heat resistance and strength. In addition, since the polyester resin composition has a high compatibility with a polyester resin and has high plasticity, the orientations of the polyester molecules during the thermoforming step are evenly accelerated, thereby improving crystallinity.

Furthermore, a polyester resin composition blended with the compound has improved plasticity and stretchability, and the same time a stretched film obtained by a secondary processing treatment (stretching) has excellent transparency, and also has excellent bleeding resistance of a plasticizer. In addition, since the polyester resin composition has a high compatibility with a polyester resin and has high plasticity, the orientations of the polyester molecules during the stretching step are evenly accelerated, thereby improving crystallinity.

Polyester Resin Composition

Polyester Resin

The polyester resin is not particularly limited so long as the polyester resin is known in the art, those having biodegradability are preferred, and biodegradable polyester resins are preferred. Specific examples include aliphatic polyester resins such as polyhydroxy butyrate, polycaprolactone, polybutylene succinate, polybutylene succinate/adipate, polyethylene succinate, polyethylene terephthalate, polylactic acid resin, polymalic acid, polyglycolic acid, polydioxanone, and poly(2-oxetanone); aliphatic aromatic co-polyester resins such as polybutylene succinate/terephthalate, polybutylene adipate/terephthalate, and polytetramethylene adipate/terephthalate; mixtures of a natural polymer such as starch, cellulose, chitin, chitosan, gluten, gelatin, zain, soybean protein, collagen, or keratin, and the aliphatic polyester resins or the aliphatic aromatic co-polyester resins mentioned above; and the like. Among them, the polybutylene succinate and the polylactic acid resin are preferred, and the polylactic acid resin is more preferred, from the viewpoint of excellent workability, economic advantages, availability, and physical properties. Here, the term "biodegradable or biodegradability" as used herein refers to a property which is capable of being degraded to low molecular compounds by microorganisms in nature. Specifically, the term means biodegradability based on "test on aerobic and ultimate biodegradation degree and disintegration degree under controlled aerobic compost conditions" of JIS K6953, ISO 14855.

The polylactic acid resin includes commercially available polylactic acid resins, for example, LACEA H-100, H-280, H-400, H-440, etc. manufactured by Mitsui Chemicals, Inc., Nature Works PLA/NW3001D and NW4032D manufactured by Nature Works LLC, and Ecoplastic U'z S-09, S-12, S-17, etc. manufactured by TOYOTA MOTOR CORPORATION; and polylactic acid resins synthesized from lactic acid and lactides. A polylactic acid resin having an optical purity of 90% or more is preferred, from the viewpoint of improving strength and heat resistance, and, for example, a polylactic acid resin such as NW4032D, manufactured by Nature Works LLC having a relative large molecular weight and a high optical purity is preferred.

In addition, in the present invention, as the polylactic acid, a stereocomplex polylactic acid, composed of two kinds of polylactic acids, each obtained from a lactic acid component containing an isomer different from one another as a main component, may be used, from the viewpoint of satisfying both strength and flexibility of the polyester resin composition, and improving heat resistance and transparency.

One polylactic acid constituting the stereocomplex polylactic acid [hereinafter referred to as "polylactic acid (A)"] contains L-form in an amount of from 90 to 100% by mol, and other component including D-form in an amount of from 0 to 10% by mol. The other polylactic acid [hereinafter referred to as "polylactic acid (B)"] contains D-form in an amount of from 90 to 100% by mol, and other component including L-form in an amount of from 0 to 10% by mol. Other components besides the L-form and the D-form include dicarboxylic acids, polyhydric alcohols, hydroxycarboxylic acids, lactone, and the like, each having a functional group capable of forming two or more ester bonds. Also, other components may be a polyester, a polyether, a polycarbonate, or the like, each having two or more unreacted functional groups mentioned above in the molecule.

The polylactic acid (A) and the polylactic acid (B) in the stereocomplex polylactic acid are in a weight ratio, i.e. polylactic acid (A)/polylactic acid (B), of preferably from 10/90 to 90/10, more preferably from 20/80 to 80/20, and even more preferably from 40/60 to 60/40.

In addition, the polylactic acid resin in the present invention may be contained as a polymer alloy formed by a blend of the polylactic acid resin with biodegradable polyester resins other than the polylactic acid resins, or with non-biodegradable resins such as polypropylene.

Here, in the present invention, a polylactic acid resin other than a polylactic acid resin composed of a lactic acid component, a dicarboxylic acid component and a diol component (a modified polylactic acid resin) is preferred, from the viewpoint of physical properties of the resins and economic advantages.

The content of the polylactic acid resin is preferably 80% by weight or more, more preferably 90% by weight or more, and even more preferably substantially 100% by weight, of the polyester resin.

In addition, the content of the polyester resin is, but not particularly limited to, preferably 50% by weight or more, more preferably 60% by weight or more, and even more preferably 70% by weight or more, of the polyester resin composition.

Plasticizer

The polyester-based plasticizer in the present invention includes a compound represented by the following formula (I):

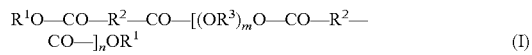

$R^1O$—CO—$R^2$—CO—[($OR^3$)$_m$O—CO—$R^2$—CO—]$_n OR^1$    (I)

wherein $R^1$ is an alkyl group having from 1 to 4 carbon atoms, $R^2$ is an alkylene group having from 2 to 4 carbon atoms, $R^3$ is an alkylene group having from 2 to 6 carbon atoms, m is the number of from 1 to 6, and n is the number of from 1 to 12, with proviso that all the $R^2$'s may be identical or different, and that all the $R^3$'s may be identical or different. Here, [($OR^3$)$_m$O—CO—$R^2$—CO—] in the formula (I) as used herein is also referred to as a repeating unit in the formula (I).

$R^1$ in the formula (I) is an alkyl group having from 1 to 4 carbon atoms, two of which are present in one molecule, the two being present at both the terminals of the molecule. $R^1$ may be linear or branched, so long as the alkyl group has from 1 to 4 carbon atoms. The number of carbon atoms of the alkyl group is preferably from 1 to 4, and more preferably from 1 to 2, from the viewpoint of improving compatibility with the polyester resin, thereby exhibiting plasticizing effect. Specific examples include a methyl group, an ethyl group, a propyl group, an isopropyl group, a butyl group, a sec-butyl group, a tert-butyl group, and an iso-butyl group, among which a methyl group and an ethyl group are preferred, and a methyl group is more preferred, from the viewpoint of improving compatibility with the polyester resin, thereby exhibiting plasticizing effect.

$R^2$ in the formula (I) is an alkylene group having from 2 to 4 carbon atoms, and a preferred example includes a linear alkylene group. Specific examples include an ethylene group, a 1,3-propylene group, and a 1,4-butylene group, among which an ethylene group and a 1,3-propylene group are preferred, and an ethylene group is more preferred, from the viewpoint of improving compatibility with the polyester resin, thereby exhibiting plasticizing effect, and an ethylene group and a 1,4-butylene group are preferred, and an ethylene group is more preferred, from the viewpoint of exhibiting plasticizing effect and from the viewpoint of economic advantages. Here, all the $R^2$'s may be identical to or different from each other.

$R^3$ in the formula (I) is an alkylene group having from 2 to 6 carbon atoms, and is present in the repeating unit in the form of an oxyalkylene group. $R^3$ may be linear or branched, so long as the alkylene group has from 2 to 6 carbon atoms. The number of carbon atoms of the alkylene group is preferably from is 2 to 6, and more preferably from 2 to 3, from the viewpoint of improving compatibility with the polyester resin, thereby exhibiting plasticizing effect. Specific examples include an ethylene group, a 1,2-propylene group, a 1,3-propylene group, a 1,2-butylene group, a 1,3-butylene group, a 1,4-butylene group, a 2-methyl-1,3-propylene group, a 1,2-pentylene group, a 1,4-pentylene group, a 1,5-pentylene group, a 2,2-dimethyl-1,3-propylene group, a 1,2-hexylene group, a 1,5-hexylene group, a 1,6-hexylene group, a 2,5-hexylene group, a 3-methyl-1,5-pentylene group, among which an ethylene group, a 1,2-propylene group, a 1,3-propylene group, and a 1,4-butylene group are preferred, from the viewpoint of improving compatibility with the polyester resin, thereby exhibiting plasticizing effect. Here, all the $R^3$'s may be identical to or different from each other.

m is the number of average repeats of the oxyalkylene group, and the number is from 1 to 6. When m becomes large, an ether group value of the compound represented by the formula (I) is increased, so that the plasticizer is more likely to be oxidized and degraded. The number is from 1 to 6, the number is preferably from 1 to 4, the number is more preferably from 1 to 3, and the number is even more preferably from 1 to 2, from the viewpoint of improving compatibility with the polyester resin, and from the viewpoint of improving transparency of the molded article obtained.

n is the number of average repeats of the repeating units, i.e. an average degree of polymerization, and the number is preferably 1 or more, more preferably 1.2 or more, even more preferably 1.5 or more, even more preferably 1.8 or more, and even more preferably 2 or more, from the viewpoint of volatile resistance. In addition, the number is preferably 12 or less, more preferably 10 or less, even more preferably 8 or less, even more preferably 7 or less, and even more preferably 6 or less, from the viewpoint of plasticizing efficiency. In addition, n is preferably from 1 to 12, more preferably from 1 to 8, even more preferably from 1.2 to 8, even more preferably from 1.5 to 7, and even more preferably from 1.8 to 7, from the viewpoint of improving volatile resistance and compatibility with the polyester resin, thereby improving plasticizing effect and plasticizing efficiency. Here, the average degree of polymerization as used herein can be calculated in accordance with a method described in Examples set forth below.

Specific examples of the compound represented by the formula (I) include an ester where $R^1$ is a methyl group, $R^2$ is an ethylene group, $R^3$ is an ethylene group, m is 2, and n is 1.6; an ester where $R^1$ is a methyl group, $R^2$ is an ethylene group, $R^3$ is an ethylene group, m is 2, and n is 2.1; an ester where $R^1$ is a methyl group, $R^2$ is an ethylene group, $R^3$ is an ethylene group, m is 2, and n is 4.3; an ester where $R^1$ is a methyl group, $R^2$ is an ethylene group, $R^3$ is a 1,3-propylene group, m is 1, and n is 4.4; an ester where $R^1$ is a methyl group, $R^2$ is an ethylene group, $R^3$ is a 1,2-propylene group, m is 1, and n is 3.6; an ester where $R^1$ is an ethyl group, $R^2$ is a 1,4-butylene group, $R^3$ is a 1,3-propylene group, m is 1, and n is 2; an ester where $R^1$ is a butyl group, $R^2$ is an ethylene group, $R^3$ is an ethylene group, m is 2, and n is 1.9; an ester where $R^1$ is a butyl group, $R^2$ is a 1,3-propylene group, $R^3$ is an ethylene group, m is 3, and n is 1.5; an ester where $R^1$ is a methyl group, $R^2$ is a 1,4-butylene group, $R^3$ is a 1,3-propylene group, m is 1, and n is 4.4; an ester where $R^1$ is a methyl group, $R^2$ is an ethylene group, $R^3$ is a 1,4-butylene group, m is 1, and n is 4.4; an ester where $R^1$ is a methyl group, $R^2$ is an ethylene group, $R^3$ is a 1,6-hexylene group, m is 1, and n is 3; an ester where $R^1$ is a methyl group, $R^2$ is an ethylene group, $R^3$ is a 1,2-propylene group, m is 1, and n is 6.5; an ester where $R^1$ is a methyl group, $R^2$ is an ethylene group, $R^3$ is a 2-methyl-1,3-propylene group, m is 1, and n is 3;

and the like. These compounds can be contained alone or in a mixture of two or more kinds. Among them, a compound where all the $R^1$'s are methyl groups, $R^2$ is an ethylene group or a 1,4-butylene group, $R^3$ is an ethylene group, a 1,3-propylene group, or a 1,2-propylene group, m is the number of from 1 to 3, and n is the number of from 1 to 8 is preferred, and a compound where all the $R^1$'s are methyl groups, $R^2$ is an ethylene group or a 1,4-butylene group, $R^3$ is an ethylene group, a 1,3-propylene group, or a 1,2-propylene group, m is the number of from 1 to 2, and n is the number of from 1.8 to 7 is more preferred.

The compound represented by the formula (I) is not particularly limited, so long the compound has the above-mentioned structure, and the compound is preferably obtained by using the following (1) to (3) raw materials.

(1) Monohydric Alcohol Containing Alkyl Group Having from 1 to 4 Carbon Atoms

The monohydric alcohol containing an alkyl group having from 1 to 4 carbon atoms is an alcohol including $R^1$ as defined above, and specific examples include methanol, ethanol, 1-propanol, 2-propanol, 1-butanol, 2-butanol, 2-methyl-1-propanol, and 1,1-dimethyl-1-ethanol. Among them, methanol, ethanol, 1-propanol, and 1-butanol are preferred, methanol and ethanol are more preferred, and methanol is even more preferred, from the viewpoint of improving compatibility with the polyester resin, thereby exhibiting plasticizing effect, and also from the viewpoint of increasing transesterification reaction efficiency.

(2) Dicarboxylic Acid Containing Alkylene Group Having from 2 to 4 Carbon Atoms

The dicarboxylic acid containing an alkylene group having from 2 to 4 carbon atoms is a dicarboxylic acid including $R^2$ as defined above, and specific examples include succinic acid, glutaric acid, adipic acid, and derivatives thereof, e.g. succinic anhydride, glutaric anhydride, dimethyl succinate, dibutyl succinate, dimethyl glutarate, dimethyl adipate. Among them, succinic acid, glutaric acid, and derivatives thereof, e.g. succinic anhydride, glutaric anhydride, dimethyl succinate, dibutyl succinate, dimethyl glutarate, are preferred, and succinic and derivatives thereof, e.g. succinic anhydride, dimethyl succinate, are more preferred, from the viewpoint of improving compatibility with the polyester resin, thereby exhibiting plasticizing effect. Also, succinic acid, adipic acid and derivatives thereof, e.g. succinic anhydride, dimethyl succinate, dibutyl succinate, dimethyl adipate, are preferred, and succinic acid and derivatives thereof, e.g. succinic anhydride, dimethyl succinate, dibutyl succinate, are more preferred, from the viewpoint of exhibiting plasticizing effect and from the viewpoint of economic advantages.

(3) Dihydric Alcohol Containing Alkylene Group Having from 2 to 6 Carbon Atoms

The dihydric alcohol containing an alkylene group having from 2 to 6 carbon atoms is a dihydric alcohol including $R^3$ as defined above, and specific examples include ethylene glycol, diethylene glycol, triethylene glycol, tetraethylene glycol, 1,2-propanediol, 1,3-propanediol, 2-methyl-1,3-propanediol, 2,2-dimethyl-1,3-propanediol, 1,2-butanediol, 1,3-butanediol, 1,4-butanediol, 2-methyl-1,3-propanediol, 1,2-pentanediol, 1,4-pentanediol, 1,5-pentanediol, 2,2-dimethyl-1,3-propanediol, 2,5-hexanediol, 1,6-hexanediol, 2,5-hexanediol, and 3-methyl-1,5-pentanediol. Among them, diethylene glycol, triethylene glycol, 1,2-propanediol, 1,3-propanediol, tetraethylene glycol, and 1,4-butanediol are preferred, diethylene glycol, triethylene glycol, 1,2-propanediol, and 1,3-propanediol are more preferred, and diethylene glycol, 1,2-propanediol, and 1,3-propanediol are even more preferred, from the viewpoint of improving compatibility with the polyester resin, thereby exhibiting plasticizing effect.

Accordingly, as (1) to (3) mentioned above:

it is preferable that (1) the monohydric alcohol is at least one member selected from the group consisting of methanol, ethanol, 1-propanol, and 1-butanol, that (2) the dicarboxylic acid is at least one member selected from the group consisting of succinic acid, glutaric acid, and derivatives thereof, and that (3) the dihydric alcohol is at least one member selected from the group consisting of diethylene glycol, triethylene glycol, 1,2-propanediol, 1,3-propanediol, tetraethylene glycol, and 1,4-butanediol;

it is more preferable that (1) the monohydric alcohol is at least one member selected from the group consisting of methanol and ethanol, that (2) the dicarboxylic acid is at least one member selected from the group consisting of succinic acid, glutaric acid, and derivatives thereof, and that (3) the dihydric alcohol is at least one member selected from the group consisting of diethylene glycol, triethylene glycol, 1,2-propanediol, and 1,3-propanediol; and it is even more preferable that (1) the monohydric alcohol is methanol, that (2) the dicarboxylic acid is at least one member selected from the group consisting of succinic acid and derivatives thereof, and that (3) the dihydric alcohol is at least one member selected from the group consisting of diethylene glycol, 1,2-propanediol, and 1,3-propanediol.

The method for obtaining a compound represented by the formula (I) by using the above (1) to (3) is not particularly limited, and includes, for example, the methods of the following Embodiment 1 and Embodiment 2:

Embodiment 1: a method including the steps of carrying out an esterification reaction between (2) the dicarboxylic acid and (1) the monohydric alcohol to synthesize a dicarboxylic acid ester (step 1); and carrying out an esterification reaction between the dicarboxylic acid ester obtained and (3) the dihydric alcohol (step 2); and Embodiment 2: a method including the step of allowing to react (1) the monohydric alcohol, (2) the dicarboxylic acid, and (3) the dihydric alcohol at one time.

Among these methods, the method of Embodiment 1 in which the alcoholysis of the polyester resin is less likely to take place is preferred, from the viewpoint of adjusting an average degree of polymerization.

The method of Embodiment 1 will be explained hereinbelow.

Embodiment 1 is a method including carrying out a transesterification reaction between a dicarboxylic acid ester, which is a reaction product of a dicarboxylic acid and a monohydric alcohol, and a dihydric alcohol. In the present specification, the method of Embodiment 1 is also referred to as a transesterification reaction.

Specifically, first, the step 1 of Embodiment 1 includes carrying out an esterification reaction between (2) the dicarboxylic acid and (1) the monohydric alcohol to synthesize a dicarboxylic acid ester. The esterification method includes, for example, a dehydration esterification method including adding (1) a monohydric alcohol to a mixture of (2) a dicarboxylic acid and a catalyst while stirring, and removing water produced or the monohydric alcohol to the external of the system.

Specific Examples Include:
1) a method including blowing steam of a monohydric alcohol in a dicarboxylic acid to carry out an esterification reaction, and at the same time removing water produced and an unreacted monohydric alcohol;
2) a method including carrying out an esterification reaction using a monohydric alcohol in excess, and at the same time azeotropically distilling water produced and the monohydric alcohol to remove these components;
3) a method including carrying out an esterification reaction, and at the same time adding a solvent for carrying out azeotropic distillation with water or water, a monohydric alcohol or the like, e.g. toluene, to remove water and an alcohol; and the like.

The catalyst includes inorganic acids such as sulfuric acid, phosphoric acid, methanesulfonic acid, and paratoluenesulfonic acid; or organic acids. Among them, paratoluenesulfonic acid is preferred. The amount of the catalyst used is preferably from 0.05 to 10 mol, and more preferably from 0.10 to 3 mol, based on 100 mol of the dicarboxylic acid.

The molar ratio of the monohydric alcohol to the dicarboxylic acid, i.e. monohydric alcohol/dicarboxylic acid, is preferably from 2/1 to 20/1, and more preferably from 3/1 to 12/1, from the viewpoint of improvement in the reaction percentage and economic advantages. Here, the term "reaction percentage" in this case means a percentage at which the raw materials used in the reaction are allowed to react, based on the dicarboxylic acid.

Although the reaction temperature may depend upon the kinds of the monohydric alcohol used, the reaction temperature is preferably from 50° to 200° C., and more preferably from 80° to 140° C., from the viewpoint of improvement in reaction percentage and inhibition of side reactions. The reaction time is preferably from 0.5 to 15 hours, and more preferably from 1.0 to 5 hours. Here, the reaction may be carried out under a reduced pressure, and the pressure is preferably reduced to a range from 2.7 to 101.3 kPa, and more preferably to a range from 6.7 to 101.3 kPa.

The dicarboxylic acid ester obtained has an alkyl esterification percentage based on the two molecular terminals of preferably 90% or more, more preferably 95% or more, and even more preferably 98% or more. Here, the alkyl esterification percentage as used herein can be calculated in accordance with the method described in Examples set forth below.

The dicarboxylic acid ester thus obtained is used in the step 2. In the present invention, in the dicarboxylic acid ester a reaction product obtained as mentioned above may be used, or a commercially available product may be used, and a commercially available product may be used in the step 2. Preferred commercially available products include dimethyl succinate (manufactured by Wako Pure Chemicals Industries, Ltd.) and dimethyl adipate (manufactured by Wako Pure Chemicals Industries, Ltd.).

The step 2 of Embodiment 1 includes carrying out a transesterification reaction of the dicarboxylic acid ester with (3) the dihydric alcohol.

Specifically, the transesterification reaction includes, for example, a transesterification reaction including continuously adding (3) a dihydric alcohol to a mixture of a dicarboxylic acid ester and a catalyst, and removing a monohydric alcohol produced to an external of the system; or a transesterification reaction including continuously adding a dicarboxylic acid ester to a mixture of (3) a dihydric alcohol and a catalyst, and removing a monohydric alcohol produced to an external of the system. In both cases, the monohydric alcohol produced is distilled off, so that the equilibrium is shifted, whereby the reaction can be progressed. Also, the catalyst may be added stepwise, and for example, a catalyst can be allowed to be present upon supplying a dihydric alcohol to a dicarboxylic acid ester, or supplying a dicarboxylic acid ester to a dihydric alcohol, and the catalyst can be further added in the stage of removing a monohydric alcohol produced to an external of the system. Here, the dicarboxylic acid ester used in the transesterification reaction can be directly a reaction mixture obtained in the above-mentioned esterification reaction or commercially available product, or can be a product after distillation and isolation thereof.

The catalyst includes, in addition to the inorganic acids such as sulfuric acid, phosphoric acid, methanesulfonic acid, and paratoluenesulfonic acid; or the organic acids mentioned above, organometallic compounds such as tetraisopropoxytitanium and tetrabutoxytitanium; alkali alkoxides such as sodium methoxide; and the like. Among them, paratoluenesulfonic acid, tetraisopropoxytitanium, tetrabutoxytitanium, and sodium methoxide are preferred. The amount of the catalyst used is such that the amount of paratoluenesulfonic acid or sodium methoxide used is preferably from 0.05 to 10 mol, and more preferably from 0.10 to 5 mol, that the amount of tetraisopropoxytitanium or tetrabutoxytitanium used is preferably from 0.0001 to 0.1 mol, and more preferably 0.0005 to 0.05 mol, each amount based on 100 mol of the dicarboxylic acid ester. Here, the amount of the catalyst used as referred to herein is a total amount of the catalyst used in the step 2.

The molar ratio of the dicarboxylic acid ester to the dihydric alcohol, i.e. dicarboxylic acid ester/dihydric alcohol, is preferably from 1.1/1 to 10/1, more preferably from 1.2/1 to 4/1, and even more preferably from 1.3/1 to 3/1, from the viewpoint of controlling the molecular weight of the ester compound in the present invention.

The reaction temperature is preferably from 50° to 250° C., and more preferably from 60° to 150° C., from the viewpoint of improving the reaction percentage and inhibiting side reactions. In this case, "the reaction percentage" means a percentage at which the raw materials used in the reaction are allowed to react, based on the dihydric alcohol. The reaction time is preferably from 0.1 to 10 hours, and more preferably from 1 to 10 hours. Here, the reaction may be carried out under a reduced pressure, and the pressure is reduced to preferably from 0.7 to 101.3 kPa, and more preferably from 2.0 to 101.3 kPa.

The method of Embodiment 2 will be explained hereinbelow.

The method of Embodiment 2 is a method including allowing to react (1) the monohydric alcohol, (2) the dicarboxylic acid, and (3) the dihydric alcohol, and optionally a catalyst at one time. In the present specification, the method of Embodiment 2 is also referred to as a one-time addition reaction.

The raw materials can be supplied at one time or in divided parts, and the monohydric alcohol may be introduced into a reactor in divided parts or continuously.

The catalyst includes inorganic acids such as sulfuric acid, phosphoric acid, methanesulfonic acid, and paratoluenesulfonic acid; or organic acids. Among them, paratoluenesulfonic acid is preferred. The amount of the catalyst used is preferably from 0.05 to 10 mol, and more preferably from 0.10 to 5 mol, based on 100 mol of the dicarboxylic acid.

The molar ratio of the dicarboxylic acid to the monohydric alcohol to the dihydric alcohol, i.e. dicarboxylic acid/monohydric alcohol/dihydric alcohol, is preferably from 1.1/1.1/1 to 10/100/1, more preferably from 1.2/3/1 to 3/30/1, and even more preferably from 1.3/5/1 to 3/20/1, from the viewpoint of controlling the molecular weight of the ester compound in the present invention.

Also, the molar ratio of the dicarboxylic acid to the dihydric alcohol, i.e. dicarboxylic acid/dihydric alcohol, is preferably from 1.2/1 to 3/1, from the viewpoint of controlling the molecular weight of the ester compound in the present invention.

The reaction temperature may depend upon the kinds of the alcohols used, and the reaction temperature is preferably from 50° to 200° C., and the reaction time is preferably from 0.5 to 15 hours. The reaction may be carried out at a reduced pressure, and preferably at a pressure of from 6.7 to 101.3 kPa. In addition, the reaction may be carried out at a temperature of from 70° to 140° C. under a normal pressure, i.e. 101.3 kPa, for 3 to 5 hours, thereby removing water produced and the monohydric alcohol, and thereafter aging the reaction mixture at a temperature of from 70° to 120° C. and pressure of from 0.7 to 26.7 kPa for 0.5 to 3 hours.

In addition, in the present invention, as Embodiment 3, an esterification reaction (dehydration esterification reaction) is carried out between (2) the dicarboxylic acid and (3) the dihydric alcohol mentioned above to synthesize a dicarboxylic acid ester, and thereafter an esterification reaction (dehydration esterification reaction) may be further carried out between the dicarboxylic acid ester obtained and (1) the monohydric alcohol.

Here, from the reaction product obtained, the unreacted raw materials and the side products may be distilled off in accordance with a known method.

Thus, a compound represented by the formula (I) is obtained.

The compound represented by the formula (I) has an acid value of preferably 1.00 mgKOH/g or less, more preferably 0.90 mgKOH/g or less, and preferably 0.05 mgKOH/g or more, and more preferably 0.1 mgKOH/g or more, from the viewpoint of bleeding resistance, and durability of a sheet, a film, a thermoformed article, and a stretched film. In addition, the compound has a hydroxyl value of preferably 10.0 mgKOH/g or less, more preferably 8.0 mgKOH/g or less, and even more preferably 5.0 mgKOH/g or less, and preferably 0.1 mgKOH/g or more, and more preferably 0.2 mgKOH/g or more, from the viewpoint of bleeding resistance. Here, the acid value and the hydroxyl value of the plasticizer as used herein can be measured in accordance with the methods described in Examples set forth below.

The saponification value of the compound represented by the formula (I) is preferably 500 mgKOH/g or more, and more preferably 600 mgKOH/g or more, and preferably 800 mgKOH/g or less, and more preferably 750 mgKOH/g or less, from the viewpoint of improving compatibility with the polyester resin, and inhibiting the generation of a volatile organic compound from the polyester resin composition. In addition, the saponification value is preferably from 500 to 800 mgKOH/g, and more preferably from 600 to 750 mgKOH/g. Here, the saponification value of the plasticizer as used herein can be measured in accordance with the method described in Examples set forth below.

The number-average molecular weight of the compound represented by the formula (I) is preferably 500 or more, more preferably 600 or more, and even more preferably 700 or more, and preferably 1,500 or less, more preferably 1,400 or less, even more preferably 1,300 or less, and even more preferably 1,200 or less, from the viewpoint of improving volatile resistance and plasticizing effect, or improving volatile resistance and plasticizing effect, thereby improving thermoformability. In addition, the number-average molecular weight is preferably from 500 to 1,500, more preferably from 500 to 1,400, even more preferably from 500 to 1,300, even more preferably from 500 to 1,200, even more preferably from 600 to 1,200, and still even more preferably from 700 to 1,200. When the number-average molecular weight is 500 or more, the volatile resistance of the polyester resin composition would be excellent, so that vaporation of the plasticizer from the resin composition is inhibited, whereby the lowering in physical properties such as flexural modulus, heat resistance, and bleeding resistance of the molded article made of the resin composition with the passage of time would be reduced. Further, when the molecular weight increases, the plasticizer has excellent compatibility with the polylactic acid resin, and a softening temperature and a crystallization velocity are appropriately controlled, whereby resulting in improvement in the moldable temperature region. Here, the number-average molecular weight of the plasticizer as used herein can be calculated in accordance with the method described in Examples set forth below.

As the compound represented by the formula (I), it is preferable that an acid value is 1.00 mgKOH/g or less, that a hydroxyl value is 10.0 mgKOH/g or less, and that a number-average molecular weight is from 500 to 1,500, it is more preferable that an acid value is 0.90 mgKOH/g or less, that a hydroxyl value is 8.0 mgKOH/g or less, and that a number-average molecular weight is from 500 to 1,400, and it is even more preferable that an acid value is 0.90 mgKOH/g or less, that a hydroxyl value is 8.0 mgKOH/g or less, and that a number-average molecular weight is from 600 to 1,200.

The compound represented by the formula (I) has an alkyl esterification percentage based on the two molecular terminals, i.e. a terminal alkyl esterification percentage, of preferably 85% or more, and more preferably 90% or more, from the viewpoint of improving compatibility with the polyester resin, thereby exhibiting plasticizing effect, and from the viewpoint of improving plasticizing efficiency. Here, the terminal alkyl esterification percentage of the plasticizer as used herein can be calculated in accordance with the method described in Examples set forth below.

The ether group value of the compound represented by the formula (I) is preferably 1 mmol/g or more, and preferably 8 mmol/g or less, more preferably 6 mmol/g or less, and even more preferably 5 mmol/g or less, from the viewpoint of improving compatibility with the polyester resin, and inhibiting the generation of volatile organic compounds from the polyester resin composition. In addition, the ether group value is preferably from 0 to 8 mmol/g, more preferably from 0 to 6 mmol/g, even more preferably from 1 to 6 mmol/g, and even more preferably from 1 to 5 mmol/g. Here, the ether group value of the plasticizer as used herein can be calculated in accordance with the method described in Examples set forth below.

The compound represented by the formula (I) has an SP (Solubility Parameter (English in original), solubility parameter) value of preferably 10.0 or more, more preferably 10.1 or more, and even more preferably 10.2 or more, and preferably 12.0 or less, more preferably 11.5 or less, and even more preferably 11.2 or less, from the viewpoint of compatibility with the polyester resin. In addition, the SP value is preferably from 10.0 to 12.0, more preferably from 10.1 to 11.5, and even more preferably from 10.2 to 11.2. Here, the SP value as used herein means an amount defined by the following formula:

$$\text{SP Value} = (\Delta E/V)^{1/2} (\text{cal}^{1/2} \text{cm}^{-3/2})$$

wherein a cohesive energy is $\Delta E$, and a molecular volume is V. For example, as described in Examples set forth below, the value can be calculated using the method of Fedors described in "*Kothing no Kisokagaku (Fundamental Science of Coating)*" authored by Yuji HARASAKI, p. 48, Maki Shoten (1988).

In the present invention, other plasticizers aside from the above-mentioned compound represented by the formula (I) can be used together within a range that would not hamper the effects of the present invention. Other plasticizers are, but not particularly limited to, preferably an ester compound in which at least one kind of the alcohol component constituting the ester compound is an alcohol reacted with an alkylene oxide having from 2 to 3 carbon atoms in an amount of from 0.5 to 5 mol on average, per one hydroxyl group, and specifically include plasticizers described in Japanese Patent Laid-Open Nos. 2008-174718 and 2008-115372, and the like. The content of the compound represented by the formula (I) is preferably 50% by weight or more, more preferably 80% by weight or more, even more preferably 90% by weight or more, and even more preferably substantially 100% by weight, of the entire plasticizer component contained in the composition, from the viewpoint of heat resistance and working operability.

In addition, the content of the compound represented by the formula (I) is preferably 1 part by weight or more, and more preferably 5 parts by weight or more, and preferably 50 parts by weight or less, and more preferably 30 parts by weight or less, based on 100 parts by weight of the polyester resin, from the viewpoint that the compound inhibits the generation of volatile organic compounds while having excellent plasticizing effect. In addition, the content is preferably from 1 to 50 parts by weight, and more preferably from 5 to 30 parts by weight.

The content of the plasticizer, in other words, a total content of other plasticizers and the compound represented by the formula (I), is preferably 1 part by weight or more, more preferably 5 parts by weight or more, and preferably 50 parts by weight or less, and more preferably 30 parts by weight or less, based on 100 parts by weight of the polyester resin, from the viewpoint of improving heat resistance, transparency, and moldability of the molded article made of the polyester resin composition. In addition, the content is preferably from 1 to 50 parts by weight, and more preferably from 5 to 30 parts by weight.

It is preferable that the polyester resin composition in the present invention further contains, in addition to the polyester resin and the compound represented by the formula (I) mentioned above, a crystal nucleating agent and a hydrolysis inhibitor. Specifically, one embodiment of the polyester resin composition in the present invention includes an embodiment containing a polyester resin, a compound represented by the formula (I), and a crystal nucleating agent, and an embodiment containing a polyester resin, a compound represented by the formula (I), a crystal nucleating agent, and a hydrolysis inhibitor.

Crystal Nucleating Agent

The crystal nucleating agent includes inorganic crystal nucleating agents and organic crystal nucleating agents. The inorganic crystal nucleating agents include natural or synthetic silicate compounds, metal salts such as titanium oxide, barium sulfate, tricalcium phosphate, calcium carbonate, and sodium phosphate, kaolinite, halloysite, talc, smectite, vermiculite, mica, and the like. The organic crystal nucleating agents include carboxylic acid amides and metal salts of phenylphosphonic acids, and the carboxylic acid amides are preferred, from the viewpoint of improving transparency. The carboxylic acid amides include ethylenebis fatty acid amides, alkylenebis fatty acid amides, and alkylenebis hydroxyfatty acid amides. The ethylenebis fatty acid amides are exemplified by ethylenebis stearamide and ethylenebis oleamide, and the alkylenebis fatty acid amides are exemplified by propylenebis fatty acid amides and butylenebis fatty acid amides. The alkylenebis hydroxyfatty acid amides are preferably an alkylenebis hydroxystearamide having an alkylene group having from 1 to 6 carbon atoms, and more preferably ethylenebis 12-hydroxystearamide.

The content of the crystal nucleating agent is preferably 0.1 parts by weight or more, and preferably 1.0 part by weight or less, and more preferably 0.5 parts by weight or less, based on 100 parts by weight of the polyester resin, from the viewpoint of improving transparency of the polyester resin composition and the molded article made of the polyester resin composition. In addition, the content is preferably from 0.1 to 1.0 part by weight, and more preferably from 0.1 to 0.5 parts by weight.

Hydrolysis Inhibitor

The hydrolysis inhibitor includes carbodiimide compounds such as polycarbodiimide compounds and monocarbodiimide compounds, and the polycarbodiimide compounds are preferred, from the viewpoint of improving durability and impact resistance of the polyester resin composition, and the monocarbodiimide compounds are preferred, from the viewpoint of improving durability and moldability (fluidity) of the polyester resin composition. In addition, it is preferable that the monocarbodiimide and the polycarbodiimide are used together, from the viewpoint of even more improving durability, impact resistance, and moldability of the molded article made of the polyester resin composition.

The polycarbodiimide compound includes poly(4,4'-diphenylmethanecarbodiimide), poly(4,4'-dicyclohexylmethanecarbodiimide), poly(1,3,5-triisopropylbenzene) polycarbodiimide, poly(1,3,5-triisopropylbenzene and 1,3-diisopropylbenzene)polycarbodiimide, and the like. The monocarbodiimide compound includes N,N'-di-2,6-diisopropylphenylcarbodiimide, and the like.

In order to satisfy durability, impact resistance, and moldability of the molded article made of the polyester resin composition, the above-mentioned carbodiimide compounds may be used alone or in a combination of two or more kinds. In addition, as the poly(4,4'-dicyclohexylmethanecarbodiimide), Carbodilite LA-1 manufactured by Nisshinbo Chemical Inc. can be purchased and used; as the poly(1,3,5-triisopropylbenzene)polycarbodiimide and poly(1,3,5-triisopropylbenzene and 1,3-diisopropylbenzene)polycarbodiimide, Stabaxol P and Stabaxol P-100 manufactured by Rhein Chemie Rheinau GmbH can be purchased and used; and as N,N'-di-2,6-diisopropylphenylcarbodiimide, Stabaxol I manufactured by Rhein Chemie Rheinau GmbH can be purchased and used, respectively.

The content of the hydrolysis inhibitor is preferably 0.05 parts by weight or more, and more preferably 0.10 parts by weight or more, and preferably 3 parts by weight or less, and more preferably 2 parts by weight or less, based on 100 parts by weight of the polyester resin, from the viewpoint of improving transparency and moldability of the molded article made of the polyester resin composition. In addition, the content is preferably from 0.05 to 3 parts by weight, and more preferably from 0.10 to 2 parts by weight.

The polyester resin composition in the present invention can contain, as other components besides those mentioned above, a filler including an inorganic filler and an organic filler, a flame retardant, an antioxidant, a lubricant such as a hydrocarbon wax or an anionic surfactant, an ultraviolet absorbent, an antistatic agent, an anti-clouding agent, a photostabilizer, a pigment, a mildewproof agent, a bactericidal agent, a blowing agent or the like, within the range that would not hamper the effects of the present invention. In addition, similarly, other polymeric materials and other resin compositions can be added within the range that would not hamper the effects of the present invention.

The polyester resin composition in the present invention can be prepared without particular limitations, so long as the polyester resin composition contains the polyester resin and the compound represented by the formula (I). For example, the polyester resin composition can be prepared by melt-kneading raw materials containing a polyester resin and a compound represented by the formula (I), and further optionally various additives, which are the raw materials for the polyester resin composition, with a known kneader, such as a closed kneader, a single-screw or twin-screw extruder, or an open roller kneader. The raw materials can also be subjected to melt-kneading after homogeneously mixing the raw materials with a Henschel mixer, a super mixer or the like in advance. Here, when the polyester resin composition is prepared, a supercritical gas may be allowed to be present while mixing in a molten state in order to promote plasticity of the polyester resin.

The melt-kneading temperature is preferably 170° C. or higher, more preferably 175° C. or higher, and even more preferably 180° C. or higher, and preferably 240° C. or lower, more preferably 220° C. or lower, and even more preferably 210° C. or lower, from the viewpoint of improving moldability and inhibition of deterioration of the polyester resin composition. In addition, the melt-kneading temperature is preferably from 170° to 240° C., more preferably from 175° to 220° C., and even more preferably from 180° to 210° C. The melt-kneading time cannot be unconditionally determined because the melt-kneading time depends upon a melt-kneading temperature and the kinds of a kneader, and the melt-kneading time is preferably from 15 to 900 seconds.

The glass transition temperature (Tg) of the melt-kneaded mixture obtained is preferably 30° C. or higher, and more preferably 35° C. or higher, and preferably 60° C. or lower, and more preferably 55° C. or lower, from the viewpoint that the compound represented by the formula (I) effectively acts as a plasticizer. In addition, the glass transition temperature is preferably from 30° to 60° C., more preferably from 30° to 55° C., and even more preferably from 35° to 55° C.

The cold crystallization temperature (Tc) of the melt-kneaded mixture is preferably 50° C. or higher, and more preferably 60° C. or higher, and preferably 110° C. or lower, more preferably 100° C. or lower, and even more preferably 90° C. or lower, from the viewpoint that the compound represented by the formula (I) effectively acts as a plasticizer. In addition, the cold crystallization temperature is preferably from 50° to 110° C., more preferably from 50° to 100° C., and even more preferably 60° to 90° C.

The melting point (Tm) of the melt-kneaded mixture is preferably 130° C. or higher, more preferably 140° C. or higher, and even more preferably 150° C. or higher, and preferably 210° C. or lower, more preferably 200° C. or lower, and even more preferably 180° C. or lower, from the viewpoint of heat resistance and processability of the molded article. In addition, the melting point is preferably from 130° to 210° C., more preferably from 140° to 200° C., and even more preferably from 150° to 180° C. The glass transition temperature (Tg), the cold crystallization temperature (Tc), and the melting point (Tm) of the polyester resin composition as used herein can be measured in accordance with the methods described in Examples set forth below.

The melt-kneaded mixture thus obtained has excellent secondary processability such as stretchability and thermoforming property, the melt-kneaded mixture is molded into a primary processed product made of the polyester resin composition, which is also referred to as a primary molded article. The primary processed product includes sheets and films. The sheets are preferred, from the viewpoint of processability into a thermoformed article or a stretched film. Here, the term "sheet" as used herein refers to those having a flat plate-like shape having a thickness of 0.1 mm or more, and the term "film" as used herein refers to those having a flat plate-like shape having a thickness of less than 0.1 mm.

The primary processed product can be prepared by subjecting a polyester resin composition mentioned above to extrusion molding or press molding.

In extrusion molding, a polyester resin composition mentioned above which is filled in a heated extruder is melted, and thereafter extruded from a T die, whereby a molded article in the form of a sheet or a film can be obtained. This molded article is immediately brought into contact with a cooling roller to cool the molded article to a temperature of lower than the Tg of the polyester resin composition to make it in an amorphous state or semi-crystalline state, and subsequently the molded article is detached from the cooling roller, and wound around with a winding roller, whereby a primary processed product in the present invention can be obtained. Here, upon filling the extruder, the raw materials constituting the polyester resin composition in the present invention containing, for example, a polyester resin and a compound represented by the formula (I), and further optionally various additives may be filled, melt-kneaded, and thereafter subjected to extrusion-molding. Here, as to the amorphous state and the semi-crystalline state as used herein, a case where a relative crystallinity obtained by a method of Test Example 1-1 set forth below is less than 60% is defined as an amorphous state, and a case where a relative crystallinity is 60% or more and less than 80% is defined as a semi-crystalline state. Accordingly, the molded article in an amorphous state or semi-crystalline state means a molded article having a relative crystallinity of less than 80%.

The temperature of the extruder is preferably 170° C. or higher, more preferably 175° C. or higher, and even more preferably 180° C. or higher, and preferably 240° C. or lower, more preferably 220° C. or lower, and even more preferably 210° C. or lower, from the viewpoint of homogeneously mixing a polyester resin composition and inhibiting the deterioration of the polyester resin. In addition, the temperature of the extruder is preferably from 170° to 240° C., more preferably from 175° to 220° C., and even more preferably from 180° to 210° C. Also, the temperature of the cooling roller is preferably set at a temperature lower than Tg of the polyester resin composition, from the viewpoint of obtaining a primary processed product in an amorphous state or a semi-amorphous state, and the temperature is specifically preferably lower than 40° C., more preferably 30° C. or lower, and even more preferably 20° C. or lower. Here, in the present invention, the temperature of the extruder means a barrel setting temperature of the extruder.

In addition, the time contacting the cooling roller is preferably from 0.1 to 50 seconds, more preferably from 0.5 to 10 seconds, and even more preferably from 0.8 to 5 seconds, from the viewpoint of obtaining a molded article in an amorphous state or a semi-crystalline state. Also, the extrusion rate is preferably from 1 to 100 m/minute, more preferably from 5 to 80 m/minute, and even more preferably from 10 to 50 m/minute, from the viewpoint of obtaining a molded article in an amorphous state or a semi-crystalline state.

In a case where a primary processed product, for example, a sheet-like primary processed product, is molded by press molding, a molded article can be prepared by subjecting a polyester resin composition in the present invention to framed press molding into a frame having a sheet-like shape.

As the temperature and pressure of the press molding, it is preferable that the press is carried out preferably under the conditions of a temperature of from 170° to 240° C. and a pressure of from 5 to 30 MPa, more preferably under the conditions of a temperature of from 175° to 220° C. and a pressure of from 10 to 25 MPa, and even more preferably under the conditions of a temperature of from 180° to 210° C. and a pressure of from 10 to 20 MPa. The press time cannot be unconditionally determined because the time depends upon the temperature and pressure of the press, and the press time is preferably from 1 to 10 minutes, more preferably from 1 to 7 minutes, and even more preferably from 1 to 5 minutes.

Also, immediately after the press under the above conditions, it is preferable that the molded product is cooled by subjecting to press preferably under the conditions of a temperature of from 0° to 40° C. and a pressure of from 5 to 30 MPa, more preferably under the conditions of a temperature of from 10° to 30° C. and a pressure of from 10 to 25 MPa, and even more preferably under the conditions of a temperature of from 10° to 20° C. and a pressure of from 10 to 20 MPa. By the press under the above temperature conditions, a polyester resin composition in the present invention is cooled to a temperature of lower than its Tg, whereby an amorphous state or a semi-crystalline state can be maintained. The press time cannot be unconditionally determined because the press time depends upon the press temperature and pressure, and the press time is preferably from 1 to 10 minutes, more preferably from 1 to 7 minutes, and even more preferably from 1 to 5 minutes.

When a sheet-like primary processed product in an amorphous state or a semi-crystalline state is prepared, its thickness is preferably 0.1 mm or more, and more preferably 0.15 mm or more, and preferably 1.5 mm or less, more preferably 1.4 mm or less, and even more preferably 1.2 mm or less, from the viewpoint of obtaining evenness in a molded article, which is a secondary processed product. In addition, the thickness is preferably from 0.1 to 1.5 mm, more preferably from 0.1 to 1.4 mm, and even more preferably from 0.15 to 1.2 mm.

When a film-like primary processed product in an amorphous state or a semi-crystalline state is prepared, its thickness is preferably 0.01 mm or more, more preferably 0.02 mm or more, and even more preferably 0.03 mm or more, and preferably less than 0.1 mm, more preferably 0.09 mm or less, and even more preferably 0.08 mm or less, from the viewpoint of obtaining evenness in a molded article, which is a secondary processed product. In addition, the thickness is preferably 0.01 or more and less than 0.1 mm, more preferably from 0.02 to 0.09 mm, and even more preferably from 0.03 to 0.08 mm.

The primary processed product thus obtained is further subjected to a processing treatment, thereby obtaining a secondary processed product, which is also referred to as a secondary molded article. The above-mentioned primary processed product in an amorphous state or a semi-amorphous state has a high effect of plasticizing a polyester resin with a compound represented by the formula (I) and has a high affinity with the polyester resin, even when subjected to a secondary processing such as crystallization (crystallization with heating), thermoforming or stretching treatment, so that the secondary processed product has excellent bleeding resistance, even in a case where an additive such as a crystal nucleating agent or a hydrolysis inhibitor is blended therewith. Also, the crystallization of the polyester resin is promoted by a stretching treatment without the blending of a crystal nucleating agent.

In the present invention, the above-mentioned primary processed product is directly heated to a temperature of equal to or higher than a glass transition temperature (Tg) and lower than a melting point (Tm) of the polyester resin composition, whereby a highly crystalline secondary processed product can be obtained. Specifically, the crystallization is carried out while holding at a temperature of preferably 60° C. or higher, and more preferably 70° C. or higher, and preferably 120° C. or lower, and more preferably 110° C. or lower, and preferably from 60° to 120° C., and more preferably from 70° to 110° C., whereby a crystallized sheet or a crystallized film having a relative crystallinity, as obtained by, for example, a method of Test Example 1-1 set forth below, of preferably 80% or more, and more preferably 90% or more can be obtained. Here, it is preferable that the thickness of the crystallized sheet or crystallized film obtained is of the same level of thickness as a sheet-like primary processed product in an amorphous state or a semi-crystalline state, or a film-like primary processed product in an amorphous state or a semi-crystalline state because the sheet or film itself is less likely to expand or shrink by heating during the crystallization.

In addition, in the present invention, a thermoformed article can be molded by using a primary processed product mentioned above in accordance with a known method without particular limitation. For example, a sheet in an amorphous state or a semi-crystalline state prepared by the above-mentioned method is thermoformed within a temperature range of equal to or higher than a glass transition temperature (Tg) and lower than a melting point (Tm) of the polyester resin composition, to thereby allow crystallization, whereby a crystallized thermoformed article having a relative crystallinity, as obtained by, for example, a method of Test Example 2-1 set forth below, of preferably 80% or more, and more preferably 90% or more can be obtained.

The thermoformed article according to the present invention includes, for example, molded articles obtained by vacuum forming or pressure forming. These can be molded in accordance with known methods without particular limitation, and the formed article is obtained, for example, by setting a sheet in an amorphous state or a semi-crystalline state of the present invention in a mold in a vacuum pressure molding machine, heating the sheet inside the mold to a temperature equal to or higher than a glass transition temperature (Tg) and lower than a melting point (Tm) of the polyester resin composition, and holding the sheet in a pressed or non-pressed state, to allow forming.

The mold temperature may be a temperature equal to or higher than a glass transition temperature (Tg) of the polyester resin composition and lower than a melting point (Tm) thereof, from the viewpoint of improving crystallization velocity and improving operability of the polylactic resin composition. Specifically, the mold temperature is preferably 120° C. or lower, more preferably 115° C. or lower, and even more preferably 110° C. or lower. In addition, the mold temperature is preferably 70° C. or higher, more preferably 75° C. or higher, and even more preferably 80° C. or higher. From the above viewpoint, the mold temperature is preferably from 70° to 120° C., more preferably from 75° to 115° C., and even more preferably from 80° to 110° C.

The holding time inside the mold is preferably from 2 to 60 seconds, more preferably from 3 to 30 seconds, and even more preferably from 5 to 20 seconds in a mold, for example, at 90° C., from the viewpoint of improving heat resistance and productivity of the thermoformed article made of the polyester resin composition. Since the polyester resin composition of the present invention has a high crystallization velocity, a molded article having sufficient heat resistance is obtained with a short holding time as mentioned above.

The thickness of a thermoformed article of the present invention thus obtained is, but not particularly limited to, preferably 0.1 mm or more, more preferably 0.15 mm or more, and even more preferably 0.2 mm or more, and preferably 1.5 mm or less, more preferably 1.4 mm or less, and even more preferably 1.2 mm or less, from the viewpoint of obtaining evenness in a molded article, which is a secondary processed product. In addition, the thickness is preferably from 0.1 to 1.5 mm, more preferably from 0.15 to 1.4 mm, and even more preferably from 0.2 to 1.2 mm.

In the thermoformed article of the present invention, since a sheet in an amorphous state or a semi-crystalline state mentioned above has excellent thermoforming property, a molding temperature range in the thermoforming is widened, so that the thermoformed article has excellent fittability. In addition, the thermoformed article has excellent plasticizing effect owing to the compound represented by the formula (I), the molded article obtained is highly crystalline, and has excellent heat resistance and transparency.

In addition, in the present invention, a stretched film can be molded by using a primary processed product mentioned above in accordance with a known method without particular limitation. For example, a sheet in an amorphous state or a semi-crystalline state prepared by the above-mentioned method is subjected to uniaxial or biaxial stretching to a desired thickness within a temperature range of equal to or higher than a glass transition temperature (Tg) and equal to or lower than a cold crystallization temperature (Tc) of the polyester resin composition, to thereby allow crystallization, whereby a crystallized stretched film having a relative crystallinity, as obtained by, for example, a method of Test Example 3-1 set forth below, of preferably 80% or more, and more preferably 90% or more can be obtained. In the biaxial stretching, it is possible to form a stretched film by simultaneous stretching or sequential stretching.

The temperature during stretching may be within a temperature range of equal to or higher than a glass transition temperature (Tg) and equal to or lower than a cold crystallization temperature (Tc) of the polyester resin composition, and specifically, the temperature is preferably 45° C. or higher, more preferably 50° C. or higher, and even more preferably 55° C. or higher, and preferably 80° C. or lower, more preferably 75° C. or lower, and even more preferably 70° C. or lower. In addition, the temperature during stretching is preferably from 45° to 80° C., more preferably from 50° to 75° C., and even more preferably from 55° to 70° C. Here, after stretching, the heat treatment (thermal fixation) can be maintained, specifically for preferably from 3 to 120 seconds, and more preferably from 5 to 60 seconds, at a temperature of preferably from 80° to 160° C., and more preferably from 90° to 150° C.

In one embodiment of the stretched film, a thermally shrinkable film can be provided. The thermally shrinkable film can be produced in accordance with a known method without particular limitations. A thermally shrinkable film is obtained, for example, by stretching in at least one orientation to a desired thickness to allow crystallization, and thereafter substantially not carrying out thermal fixation. As a method of stretching, a uniaxial or biaxial stretching can be carried out. In the case of biaxial stretching, simultaneous stretching or sequential stretching may be carried out. Among them, in the case of sequential stretching, a thermally shrinkable film having a greatly different stretching folds in length and width orientations can be prepared, whereby a stretched film showing more favorable physical properties as a shrinkable label can be obtained.

The thickness of a stretched film of the present invention thus obtained is preferably 0.01 mm or more, more preferably 0.02 mm or more, and even more preferably 0.03 mm or more, and preferably less than 0.1 mm, more preferably 0.09 mm or less, and even more preferably 0.08 mm or less, from the viewpoint of transparency and rigidity. In addition, the thickness is preferably 0.01 mm or more and less than 0.1 mm, more preferably from 0.02 to 0.09 mm, and even more preferably from 0.03 to 0.08 mm.

The stretched film of the present invention is crystallized by uniaxial or biaxial stretching, so that mechanical strength is increased, thereby showing excellent physical properties as a stretched film. In addition, the stretched film has excellent plasticizing effect by the compound represented by the formula (I) and has a high affinity with the polylactic acid resin, so that the stretched film has excellent bleeding resistance and excellent crystallinity.

The present invention also provides a method for producing a sheet or a film of the present invention.

The method for production is not particularly limited, so long as the method includes the step of molding a polyester resin composition containing a polyester resin and a compound represented by the formula (I) mentioned above, and steps can be properly added depending upon the kinds of the molded articles obtained.

The method will be explained hereinbelow by taking a method for producing a crystallized sheet or a crystallized film having a relative crystallinity of 80% or more as an example.

Specifically, the method includes an embodiment including the following steps (1) and (2-1):

step (1): cooling a sheet or a film obtained by extruding a polyester resin composition containing a polyester resin and a compound represented by the formula (I) from a die according to an extrusion molding method to a temperature lower than a glass transition temperature (Tg) of the polyester resin composition, to provide a sheet or a film having a relative crystallinity of less than 80%; and step (2-1): heating a sheet or a film obtained in the step (1) to a temperature of equal to or higher than a glass transition temperature (Tg) of the polyester resin composition and lower than a melting point (Tm) of the polyester resin composition, to provide a crystallized sheet or film having a relative crystallinity of 80% or more.

The step (1) is a step of providing a sheet or a film having a relative crystallinity of less than 80%. Specifically, a polyester resin composition containing a polyester resin and a compound represented by the formula (I) is melt-kneaded at a temperature of preferably 170° C. or higher, more preferably 175° C. or higher, and even more preferably 180° C. or higher, and preferably 240° C. or lower, more preferably 220° C. or lower, and even more preferably 210° C. or lower, and preferably from 170° to 240° C., more preferably from 175° to 220° C., and even more preferably from 180° to 210° C.; thereafter, a melt-kneaded mixture is extruded from a die in an extruder heated to preferably 170° C. or higher, more preferably 175° C. or higher, and even more preferably 180° C. or higher, and preferably 240° C. or lower, more preferably 220° C. or lower, and even more preferably 210° C. or lower, and preferably from 170° to 240° C., more preferably from 175° to 220° C., and even more preferably from 180° to 210° C.; subsequently, an extruded mixture is contacted with a cooling roller set at a temperature of preferably lower than 40° C., more preferably 30° C. or lower, and even more preferably 20° C. or lower for preferably from 0.1 to 50 seconds, more preferably from 0.5 to 10 seconds, and even more preferably from 0.8 to 5 seconds to cool, whereby a sheet or a film having a relative crystallinity of less than 80% can be prepared. In addition, depending upon the kinds of an extruder used, raw materials for the polyester resin composition are filled in an extruder, and directly melt-kneaded, and subsequently extruded to mold.

The step (2-1) is a step of crystallizing a sheet or a film having a relative crystallinity of less than 80%. For example, a sheet or a film mentioned above may be directly heated to a temperature of equal to or higher than a glass transition temperature (Tg) and lower than a melting point (Tm) of the polyester resin composition, it is held at a temperature of preferably 60° C. or higher, and more preferably 70° C. or higher, and preferably 120° C. or lower, and more preferably 110° C. or lower, and preferably from 60° to 120° C., and more preferably from 70° to 110° C., whereby a sheet or a film can be crystallized. The holding time is preferably from 5 to 60 seconds, more preferably from 7 to 45 seconds, and even more preferably from 10 to 30 seconds.

The sheet or film of the present invention thus obtained has a high crystallinity, such as a relative crystallinity is preferably 80% or more, and more preferably 90% or more, and has excellent transparency, and excellent heat resistance and bleeding resistance. Therefore, the sheet or film can be suitably used in various applications, especially in wrapping containers such as clear cases for daily sundries, cosmetics, and household electric appliances, and transparent windows of paper boxes, or stationeries such as clear plastic holders and ID card cases.

The present invention also provides a method for producing a thermoformed article of the present invention.

The method for production is not particularly limited, so long as the method includes a step of thermoforming a polyester resin composition containing a polyester resin and a compound represented by the formula (I) mentioned above, and steps can be properly added depending upon the kinds of the molded articles obtained.

Specifically, the method includes an embodiment including the following steps:

step (1): cooling a sheet or a film obtained by extruding a polyester resin composition containing a polyester resin and a compound represented by the formula (I) from a die according to an extrusion molding method to a temperature lower than a glass transition temperature (Tg) of the polyester resin composition, to provide a sheet or a film having a relative crystallinity of less than 80%; and step (2-2): thermoforming a sheet obtained in the step (1) within a temperature range of equal to or higher than a glass transition temperature (Tg) and lower than a melting point (Tm) of the polyester resin composition, to provide a crystallized thermoformed article having a relative crystallinity of 80% or more.

The step (1) is the same as mentioned above, and preferably in the step (1), a sheet having a relative crystallinity of less than 80% is obtained.

The step (2-2) is a step of crystallizing a sheet having a relative crystallinity of less than 80%. For example, a sheet mentioned above is set in a mold at preferably 70° C. or higher, more preferably 75° C. or higher, and even more preferably 80° C. or higher, and preferably 120° C. or lower, more preferably 115° C. or lower, and even more preferably 110° C. or lower, and preferably from 70° to 120° C., more preferably from 75° to 115° C., and even more preferably from 80° to 110° C., and held in a pressed or non-pressed state, so that the sheet can be crystallized. The thickness of the molded article obtained is, but not particularly limited to, preferably from 0.1 to 1.5 mm, and more preferably from 0.15 to 1.4 mm. Here, before setting the sheet obtained in the step (1) in a mold, a sheet may be previously heated to a temperature, for example, a temperature near a mold temperature, and then molded.

The thermoformed article of the present invention thus obtained is highly crystalline such as a relative crystallinity is preferably 80% or more, and more preferably 90% or more, and has excellent transparency, and excellent heat resistance, bleeding resistance, and strength, so that the thermoformed article can be suitably used in various applications, such as blister packs or trays for manufactured articles such as daily sundries, cosmetics, and household electric appliances; food containers such as lids for lunch-boxes; or industrial trays used in transportation or protection of industrial parts.

The present invention also provides a method for producing a stretched film of the present invention.

The method for production is not particularly limited, so long as the method includes a step of stretching a polyester resin composition containing a polyester resin and a compound represented by the formula (I) mentioned above, and steps can be properly added depending upon the kinds of the molded articles obtained.

Specifically, the method includes an embodiment including the following steps:

step (1): cooling a sheet obtained by extruding a polyester resin composition containing a polyester resin and a compound represented by the formula (I) from a die according to an extrusion molding method to a temperature lower than a glass transition temperature (Tg) of the polyester resin composition, to provide a sheet having a relative crystallinity of less than 80%; and step (2-3): subjecting a sheet obtained in the step (1) to uniaxial stretching or biaxial stretching within a temperature range of equal to or higher than a glass transition temperature (Tg) and equal to or lower than a cold crystallization temperature (Tc) of the polyester resin composition, to provide a crystallized stretched film having a relative crystallinity of 80% or more.

The step (1) is the same as mentioned above, and preferably in the step (1), a sheet having a relative crystallinity of less than 80% is obtained. In addition, a sheet is extruded in a tubular form with an inflation molding machine to which a circular die is attached upon extrusion from a die, and thereafter an extruded mixture is subjected to a contact (immersion)-passing for preferably from 0.1 to 50 seconds, more preferably from 0.5 to 10 seconds, and even more preferably from 0.8 to 5 seconds with a water cooler or a water tank set to a valve outer circumference set at a temperature of preferably lower than 40° C., more preferably 30° C. or lower, and even more preferably 20° C. or lower to cool, whereby a sheet having a relative crystallinity of less than 80% can be prepared.

The (2-3) is a step of subjecting a sheet having a relative crystallinity of less than 80% to uniaxial or biaxial stretching to crystallize. For example, a sheet mentioned above is subjected to uniaxial or biaxial stretching at a temperature of preferably 45° C. or higher, more preferably 50° C. or higher, and even more preferably 55° C. or higher, and preferably 80° C. or lower, more preferably 75° C. or lower, and more preferably 70° C. or lower, and preferably from 45° to 80° C., more preferably from 50° to 75° C., and even more preferably from 55° to 70° C. to a desired thickness, preferably 0.01 mm or more and less than 0.1 mm, more preferably from 0.02 to 0.09 mm, and even more preferably from 0.03 to 0.08 mm, whereby a sheet can be crystallized. Here, after stretching, a step of a heat treatment (thermal fixation) may be carried out specifically at a temperature of preferably from 80° to 160° C., and more preferably from 90° to 150° C.

The stretching fold is properly selected within the range of preferably from 1.5 to 6 folds, and more preferably from 2 to 5 folds in a length direction, and preferably from 1.5 to 6 folds, and more preferably 2 to 5 folds in a width direction. Further, it is preferable that the stretching folds are 2 folds or more in both length and width directions, from the viewpoint of strength and thickness accuracy of the film. In addition, a product of a stretching fold in a length direction multiplied by a stretching fold in a width direction, in other words, an areal stretching fold, is preferably from 4 to 36 folds, more preferably from 6 to 20 folds, and even more preferably from 8 to 16 folds. In addition, the stretching rate is preferably from 10 to 100,000%/minute, and more preferably from 100 to 10,000%/minute. These proper ranges differ depending upon the components of the resins, and the heat history of an unstretched sheet, so that the proper ranges would be appropriately determined taking strength and elongation of the film into consideration.

The stretched film of the present invention thus obtained is highly crystalline, such as a relative crystallinity is preferably 80% or more, and more preferably 90% or more, and has excellent transparency and excellent film strength and bleeding resistance, so that the stretched film can be suitably used in various application, especially wrapping materials for daily sundries, cosmetics, household electric appliances, and the like, industrial various films, or films for food wrappings for bread, sweets and snacks, vegetables, and the like.

The present invention can relate to any of the followings:
<1>

A molded article selected from the group consisting of (1) a sheet or a film, (2) a thermoformed article, (3) a stretched film, wherein the molded article is made of a polyester resin composition containing a polyester resin and a polyester-based plasticizer represented by the following formula (I):

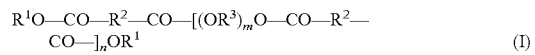

wherein $R^1$ is an alkyl group having from 1 to 4 carbon atoms, $R^2$ is an alkylene group having from 2 to 4 carbon atoms, $R^3$ is an alkylene group having from 2 to 6 carbon atoms, m is the number of from 1 to 6, and n is the number of from 1 to 12, with proviso that all the $R^2$'s may be identical or different, and that all the $R^3$'s may be identical or different.

<2>
The molded article according to <1>, wherein the polyester resin contains a polylactic acid resin.
<3>
The molded article according to <2>, wherein the content of the polylactic acid resin is preferably 80% by weight or more, more preferably 90% by weight or more, and even more preferably substantially 100% by weight, of the polyester resin.
<4>
The molded article according to any one of <1> to <3>, wherein the content of the polyester resin is preferably 50% by weight or more, more preferably 60% by weight or more, and even more preferably 70% by weight or more, of the polyester resin composition.
<5>
The molded article according to any one of <1> to <4>, wherein $R^1$ in the formula (I) is an alkyl group having the number of carbon atoms of from 1 to 4, and preferably from 1 to 2, wherein the alkyl group is selected from the group consisting of a methyl group, an ethyl group, a propyl group, an isopropyl group, a butyl group, a sec-butyl group, a tert-butyl group, and an iso-butyl group, wherein a methyl group and an ethyl group are preferred, and a methyl group is more preferred.
<6>
The molded article according to any one of <1> to <5>, wherein $R^2$ in the formula (I) is an alkylene group having from 2 to 4 carbon atoms, wherein the alkylene group is one or more members selected from the group consisting of an ethylene group, a 1,3-propylene group, and a 1,4-butylene group, wherein an ethylene group and a 1,3-propylene group, or an ethylene group and a 1,4-butylene group are preferred, and an ethylene group is more preferred.
<7>
The molded article according to any one of <1> to <6>, wherein $R^3$ in the formula (I) is an alkylene group having the number of carbon atoms of preferably from 2 to 6, and more preferably from 2 to 3, wherein the alkylene group is one or more members selected from the group consisting of an ethylene group, a 1,2-propylene group, a 1,3-propylene group, a 1,2-butylene group, a 1,3-butylene group, a 1,4-butylene group, a 2-methyl-1,3-propylene group, a 1,2-pentylene group, a 1,4-pentylene group, a 1,5-pentylene group, a 2,2-dimethyl-1,3-propylene group, a 1,2-hexylene group, a 1,5-hexylene group, a 1,6-hexylene group, a 2,5-hexylene group, a 3-methyl-1,5-pentylene group, wherein an ethylene group, a 1,2-propylene group, a 1,3-propylene group, and a 1,4-butylene group are preferred.
<8>
The molded article according to any one of <1> to <7>, wherein m is the number of from 1 to 6, the number of preferably from 1 to 4, the number of more preferably from 1 to 3, and the number of even more preferably from 1 to 2.
<9>
The molded article according to any one of <1> to <8>, wherein n is the number of preferably 1 or more, more preferably 1.2 or more, even more preferably 1.5 or more, even more preferably 1.8 or more, and even more preferably 2 or more, and preferably 12 or less, more preferably 10 or less, even more preferably 8 or less, even more preferably 7 or less, and even more preferably 6 or less.
<10>
The molded article according to any one of <1> to <9>, wherein the compound represented by the formula (I) is preferably an ester where $R^1$ is a methyl group, $R^2$ is an ethylene group, $R^3$ is an ethylene group, m is 2, and n is 1.6; an ester where $R^1$ is a methyl group, $R^2$ is an ethylene group, $R^3$ is an ethylene group, m is 2, and n is 2.1; an ester where $R^1$ is a methyl group, $R^2$ is an ethylene group, $R^3$ is an ethylene group, m is 2, and n is 4.3; an ester where $R^1$ is a methyl group, $R^2$ is an ethylene group, $R^3$ is a 1,3-propylene group, m is 1, and n is 4.4; an ester where $R^1$ is a methyl group, $R^2$ is an ethylene group, $R^3$ is a 1,2-propylene group, m is 1, and n is 3.6; an ester where $R^1$ is an ethyl group, $R^2$ is a 1,4-butylene group, $R^3$ is a 1,3-propylene group, m is 1, and n is 2; an ester where $R^1$ is a butyl group, $R^2$ is an ethylene group, $R^3$ is an ethylene group, m is 2, and n is 1.9; an ester where $R^1$ is a butyl group, $R^2$ is a 1,3-propylene group, $R^3$ is an ethylene group, m is 3, and n is 1.5; an ester where $R^1$ is a methyl group, $R^2$ is a 1,4-butylene group, $R^3$ is a 1,3-propylene group, m is 1, and n is 4.4; an ester where $R^1$ is a methyl group, $R^2$ is an ethylene group, $R^3$ is a 1,4-butylene group, m is 1, and n is 4.4; an ester where $R^1$ is a methyl group, $R^2$ is an ethylene group, $R^3$ is a 1,6-hexylene group, m is 1, and n is 3; an ester where $R^1$ is a methyl group, $R^2$ is an ethylene group, $R^3$ is a 1,2-propylene group, m is 1, and n is 6.5; or an ester where $R^1$ is a methyl group, $R^2$ is an ethylene group, $R^3$ is a 2-methyl-1,3-propylene group, m is 1, and n is 3;
a compound where all the $R^1$'s are methyl groups, $R^2$ is an ethylene group or a 1,4-butylene group, $R^3$ is an ethylene group, a 1,3-propylene group, or a 1,2-propylene group, m is the number of from 1 to 3, and n is the number of from 1 to 8 is more preferred; and
a compound where all the $R^1$'s are methyl groups, $R^2$ is an ethylene group or a 1,4-butylene group, $R^3$ is an ethylene group, a 1,3-propylene group, or a 1,2-propylene group, m is the number of from 1 to 2, and n is the number of from 1.8 to 7 is even more preferred.
<11>
The molded article according to any one of <1> to <10>, wherein the compound represented by the formula (I) is preferably obtained by using the following (1) to (3) raw materials.
(1) a monohydric alcohol containing an alkyl group having from 1 to 4 carbon atoms;
(2) a dicarboxylic acid containing an alkylene group having from 2 to 4 carbon atoms; and
(3) a dihydric alcohol containing an alkylene group having from 2 to 6 carbon atoms.
<12>
The molded article according to <11>, wherein (1) the monohydric alcohol containing an alkyl group having from 1 to 4 carbon atoms is one or more members selected from the group consisting of methanol, ethanol, 1-propanol, 2-propanol, 1-butanol, 2-butanol, 2-methyl-1-propanol, and 1,1-dimethyl-1-ethanol, wherein methanol, ethanol, 1-propanol, and 1-butanol are preferred, methanol and ethanol are more preferred, and methanol is even more preferred.
<13>
The molded article according to <11> or <12>, wherein (2) the dicarboxylic acid containing an alkylene group having from 2 to 4 carbon atoms is one or more members selected from the group consisting of succinic acid, glutaric acid, adipic acid, and derivatives thereof, e.g. succinic anhydride, glutaric anhydride, dimethyl succinate, dibutyl succinate, dimethyl glutarate, dimethyl adipate, wherein succinic acid, glutaric acid, and derivatives thereof, e.g. succinic anhydride, glutaric anhydride, dimethyl succinate, dibutyl succinate, dimethyl glutarate, are preferred, and succinic acid and derivatives thereof, e.g. succinic anhydride, dimethyl succinate, are more preferred, or alternatively succinic acid, adipic acid and derivatives thereof, e.g. succinic anhydride, dimethyl succinate, dibutyl succinate, dimethyl adipate, are preferred, and succinic acid and derivatives thereof, e.g. succinic anhydride, dimethyl succinate, dibutyl succinate, are more preferred.

<14>
The molded article according to any one of <11> to <13>, wherein (3) the dihydric alcohol containing an alkylene group having from 2 to 6 carbon atoms is one or more members selected from the group consisting of ethylene glycol, diethylene glycol, triethylene glycol, tetraethylene glycol, 1,2-propanediol, 1,3-propanediol, 2-methyl-1,3-propanediol, 2,2-dimethyl-1,3-propanediol, 1,2-butanediol, 1,3-butanediol, 1,4-butanediol, 2-methyl-1,3-propanediol, 1,2-pentanediol, 1,4-pentanediol, 1,5-pentanediol, 2,2-dimethyl-1,3-propanediol, 2,5-hexanediol, 1,6-hexanediol, 2,5-hexanediol, and 3-methyl-1,5-pentanediol, wherein diethylene glycol, triethylene glycol, 1,2-propanediol, 1,3-propanediol, tetraethylene glycol, and 1,4-butanediol are preferred, diethylene glycol, triethylene glycol, 1,2-propanediol, and 1,3-propanediol are more preferred, and diethylene glycol, 1,2-propanediol, and 1,3-propanediol are even more preferred.

<15>
The molded article according to <11>, wherein:
it is preferable that (1) the monohydric alcohol is at least one member selected from the group consisting of methanol, ethanol, 1-propanol, and 1-butanol, that (2) the dicarboxylic acid is at least one member selected from the group consisting of succinic acid, glutaric acid, and derivatives thereof, and that (3) the dihydric alcohol is at least one member selected from the group consisting of diethylene glycol, triethylene glycol, 1,2-propanediol, 1,3-propanediol, tetraethylene glycol, and 1,4-butanediol;
it is more preferable that (1) the monohydric alcohol is at least one member selected from the group consisting of methanol and ethanol, that (2) the dicarboxylic acid is at least one member selected from the group consisting of succinic acid, glutaric acid, and derivatives thereof, and that (3) the dihydric alcohol is at least one member selected from the group consisting of diethylene glycol, triethylene glycol, 1,2-propanediol, and 1,3-propanediol;
it is even more preferable that (1) the monohydric alcohol is methanol, that (2) the dicarboxylic acid is at least one member selected from the group consisting of succinic acid and derivatives thereof, and that (3) the dihydric alcohol is at least one member selected from the group consisting of diethylene glycol, 1,2-propanediol, and 1,3-propanediol.

<16>
The molded article according to any one of <11> to <15>, wherein the compound represented by the formula (I) is obtained by a method of the following Embodiment 1 or Embodiment 2:
Embodiment 1: a method including the steps of carrying out an esterification reaction between (2) the dicarboxylic acid and (1) the monohydric alcohol to synthesize a dicarboxylic acid ester (step 1); and carrying out an esterification reaction between the dicarboxylic acid ester obtained and (3) the dihydric alcohol (step 2); and
Embodiment 2: a method including the steps of allowing to react (1) the monohydric alcohol, (2) the dicarboxylic acid, and (3) the dihydric alcohol at one time.

<17>
The molded article according to any one of <1> to <16>, wherein the compound represented by the formula (I) has an acid value of preferably 1.00 mgKOH/g or less, more preferably 0.90 mgKOH/g or less, and preferably 0.05 mgKOH/g or more, and more preferably 0.1 mgKOH/g or more.

<18>
The molded article according to any one of <1> to <17>, wherein the compound represented by the formula (I) has a hydroxyl value of preferably 10.0 mgKOH/g or less, more preferably 8.0 mgKOH/g or less, and even more preferably 5.0 mgKOH/g or less, and preferably 0.1 mgKOH/g or more, and more preferably 0.2 mgKOH/g or more.

<19>
The molded article according to any one of <1> to <18>, wherein the saponification value of the compound represented by the formula (I) is preferably 500 mgKOH/g or more, and more preferably 600 mgKOH/g or more, and preferably 800 mgKOH/g or less, and more preferably 750 mgKOH/g or less, <20>
The molded article according to any one of <1> to <19>, wherein the number-average molecular weight of the compound represented by the formula (I) is preferably 500 or more, more preferably 600 or more, and even more preferably 700 or more, and preferably 1,500 or less, more preferably 1,400 or less, even more preferably 1,300 or less, and even more preferably 1,200 or less.

<21>
The molded article according to any one of <1> to <20>, wherein as the compound represented by the formula (I), it is preferable that an acid value is 1.00 mgKOH/g or less, that a hydroxyl value is 10.0 mgKOH/g or less, and that a number-average molecular weight is from 500 to 1,500, it is more preferable that an acid value is 0.90 mgKOH/g or less, that a hydroxyl value is 8.0 mgKOH/g or less, and that a number-average molecular weight is from 500 to 1,400, and it is even more preferable that an acid value is 0.90 mgKOH/g or less, that a hydroxyl value is 8.0 mgKOH/g or less, and that a number-average molecular weight is from 600 to 1,200.

<22>
The molded article according to any one of <1> to <21>, wherein the compound represented by the formula (I) has a terminal alkyl esterification percentage of preferably 85% or more, and more preferably 90% or more.

<23>
The molded article according to any one of <1> to <22>, wherein the ether group value of the compound represented by the formula (I) is preferably 1 mmol/g or more, and preferably 8 mmol/g or less, more preferably 6 mmol/g or less, and even more preferably 5 mmol/g or less.

<24>
The molded article according to any one of <1> to <23>, wherein the compound represented by the formula (I) has an SP (Solubility Parameter (English in original), solubility parameter) value of preferably 10.0 or more, more preferably 10.1 or more, and even more preferably 10.2 or more, and preferably 12.0 or less, more preferably 11.5 or less, and even more preferably 11.2 or less.

<25>
The molded article according to any one of <1> to <24>, wherein the content of the compound represented by the formula (I) is preferably 1 part by weight or more, and more preferably 5 parts by weight or more, and preferably 50 parts by weight or less, and more preferably 30 parts by weight or less, based on 100 parts by weight of the polyester resin.

<26>
The molded article according to any one of <1> to <25>, wherein the polyester resin composition further contains a crystal nucleating agent.

<27>
The molded article according to <26>, wherein the crystal nucleating agent is preferably an inorganic crystal nucleating agent or an organic crystal nucleating agent, more preferably an organic crystal nucleating agent, even more preferably carboxylic acid amides and metal salts of phenylphosphonic acids, even more preferably the carboxylic acid amides, even more preferably ethylenebis fatty acid amides, alkylenebis fatty acid amides, and alkylenebis hydroxyfatty acid amides, even more preferably alkylenebis hydroxystearamides having an alkylene group having from 1 to 6 carbon atoms, and even more preferably ethylenebis 12-hydroxystearamide.

<28>

The molded article according to <26> or <27>, wherein the content of the crystal nucleating agent is preferably 0.1 parts by weight or more, and preferably 1.0 part by weight or less, and more preferably 0.5 parts by weight or less, based on 100 parts by weight of the polyester resin.

<29>

The molded article according to any one of <1> to <28>, wherein the polyester resin composition further contains a hydrolysis inhibitor.

<30>

The molded article according to <29>, wherein the hydrolysis inhibitor is preferably polycarbodiimide compounds and monocarbodiimide compounds.

<31>

The molded article according to <29> or <30>, wherein the content of the hydrolysis inhibitor is preferably 0.05 parts by weight or more, and more preferably 0.10 parts by weight or more, and preferably 3 parts by weight or less, and more preferably 2 parts by weight or less, based on 100 parts by weight of the polyester resin.

<32>

The molded article according to any one of <1> to <31>, wherein the polyester resin composition is prepared by melt-kneading raw materials containing a polyester resin and a compound represented by the formula (I), and further optionally various additives.

<33>

The molded article according to <32>, wherein the melt-kneading temperature is preferably 170° C. or higher, more preferably 175° C. or higher, and even more preferably 180° C. or higher, and preferably 240° C. or lower, more preferably 220° C. or lower, and even more preferably 210° C. or lower.

<34>

The molded article according to <32> or <33>, wherein the glass transition temperature (Tg) of the melt-kneaded mixture obtained is preferably 30° C. or higher, and more preferably 35° C. or higher, and preferably 60° C. or lower, and more preferably 55° C. or lower.

<35>

The molded article according to any one of <32> to <34>, wherein the cold crystallization temperature (Tc) of the melt-kneaded mixture obtained is preferably 50° C. or higher, and more preferably 60° C. or higher, and preferably 110° C. or lower, more preferably 100° C. or lower, and even more preferably 90° C. or lower.

<36>

The molded article according to any one of <32> to <35>, wherein the melting point (Tm) of the melt-kneaded mixture obtained is preferably 130° C. or higher, more preferably 140° C. or higher, and even more preferably 150° C. or higher, and preferably 210° C. or lower, more preferably 200° C. or lower, and even more preferably 180° C. or lower.

<37>

The molded article according to any one of <1> to <36>, wherein the polyester resin composition is molded into a primary processed product selected from sheets and films.

<38>

The molded article according to <37>, wherein the primary processed product is prepared by subjecting a polyester resin composition to extrusion molding or press molding.

<39>

The molded article according to <37> or <38>, wherein the primary processed product is made into an amorphous state or a semi-crystalline state by filling a polyester resin composition mentioned above in an extruder, and thereafter extruding the composition from a T die, bringing an extruded mixture into contact with a cooling roller to cool the primary processed product to a temperature of lower than the Tg of the polyester resin composition.

<40>

The molded article according to <39>, wherein the temperature of the extruder is preferably 170° C. or higher, more preferably 175° C. or higher, and even more preferably 180° C. or higher, and preferably 240° C. or lower, more preferably 220° C. or lower, and even more preferably 210° C. or lower.

<41>

The molded article according to <39> or <40>, wherein the temperature of the cooling roller is preferably lower than 40° C., more preferably 30° C. or lower, and even more preferably 20° C. or lower.

<42>

The molded article according to <37> or <38>, wherein the primary processed product is obtained by subjecting a polyester resin composition to framed press molding into a frame having a sheet-like shape.

<43>

The molded article according to <42>, wherein as the temperature and pressure of the press molding, it is preferable that the press is carried out preferably under the conditions of a temperature of from 170° to 240° C. and a pressure of from 5 to 30 MPa, more preferably under the conditions of a temperature of from 175° to 220° C. and a pressure of from 10 to 25 MPa, and even more preferably under the conditions of a temperature of from 180° to 210° C. and a pressure of from 10 to 20 MPa.

<44>

The molded article according to <43>, wherein the molded article is further pressed under the conditions of a temperature of from 0° to 40° C. and a pressure of from 5 to 30 MPa, more preferably under the conditions of a temperature of from 10° to 30° C. and a pressure of from 10 to 25 MPa, and even more preferably under the conditions of a temperature of from 10° to 20° C. and a pressure of from 10 to 20 MPa to make it in an amorphous state or a semi-crystalline state.

<45>

The molded article according to <39> or <44>, wherein the thickness of a sheet-like primary processed product in an amorphous state or a semi-crystalline state is preferably 0.1 mm or more, and more preferably 0.15 mm or more, and preferably 1.5 mm or less, more preferably 1.4 mm or less, and even more preferably 1.2 mm or less.

<46>

The molded article according to <39> or <44>, wherein the thickness of a film-like primary processed product in an amorphous state or a semi-crystalline state is preferably 0.01 mm or more, more preferably 0.02 mm or more, and even more preferably 0.03 mm or more, and preferably less than 0.1 mm, more preferably 0.09 mm or less, and even more preferably 0.08 mm or less.

<47>

The molded article according to any one of <37> to <46>, wherein the primary process product is further subjected to a processing treatment, thereby molding into a secondary processed product.

<48>

The molded article according to <47>, wherein the primary processed product is directly heated to a temperature of equal to or higher than a glass transition temperature (Tg) and lower than a melting point (Tm) of the polyester resin composition, thereby molding into a highly crystalline secondary processed product.

<49>

The molded article according to <48>, wherein the heating temperature is preferably 60° C. or higher, and more preferably 70° C. or higher, and preferably 120° C. or lower, and more preferably 110° C. or lower.

<50>

The molded article according to <48> or <49>, wherein a crystallized sheet or a crystallized film has a relative crystallinity of preferably 80% or more, and more preferably 90% or more.

<51>

The molded article according to <47>, wherein the sheet in an amorphous state or a semi-crystalline state is thermoformed within a temperature range of equal to or higher than a glass transition temperature (Tg) and lower than a melting point (Tm) of the polyester resin composition.

<52>

The molded article according to <51>, wherein the thermoforming includes setting a sheet in an amorphous state or a semi-crystalline state in a mold in a vacuum pressure molding machine, heating the sheet inside the mold to a temperature equal to or higher than a glass transition temperature (Tg) and lower than a melting point (Tm) of the polyester resin composition, and holding the sheet in a pressed or non-pressed state, to allow forming.

<53>

The molded article according to <52>, wherein the mold temperature is preferably 120° C. or lower, more preferably 115° C. or lower, and even more preferably 110° C. or lower, and preferably 70° C. or higher, more preferably 75° C. or higher, and even more preferably 80° C. or higher.

<54>

The molded article according to any one of <51> to <53>, wherein a thermoformed article has a relative crystallinity of preferably 80% or more, and more preferably 90% or more.

<55>

The molded article according to any one of <51> to <54>, wherein the thickness of a thermoformed article is preferably 0.1 mm or more, more preferably 0.15 mm or more, and even more preferably 0.2 mm or more, and preferably 1.5 mm or less, more preferably 1.4 mm or less, and even more preferably 1.2 mm or less.

<56>

The molded article according to <47>, wherein a sheet in an amorphous state or a semi-crystalline state is subjected to uniaxial or biaxial stretching to a desired thickness within a temperature range of equal to or higher than a glass transition temperature (Tg) and equal to or lower than a cold crystallization temperature (Tc) of the polyester resin composition.

<57>

The molded article according to <56>, wherein the temperature during stretching is preferably 45° C. or higher, more preferably 50° C. or higher, and even more preferably 55° C. or higher, and preferably 80° C. or lower, more preferably 75° C. or lower, and even more preferably 70° C. or lower.

<58>

The molded article according to <57>, wherein the heat treatment (thermal fixation) is maintained for preferably from 3 to 120 seconds, and more preferably from 5 to 60 seconds, at a temperature of preferably from 80° to 160° C., and more preferably from 90° to 150° C.

<59>

The molded article according to any one of <56> to <58>, wherein a stretched film has a relative crystallinity of preferably 80% or more, and more preferably 90% or more.

<60>

The molded article according to any one of <56> to <59>, wherein the thickness of a stretched film is preferably 0.01 mm or more, more preferably 0.02 mm or more, and even more preferably 0.03 mm or more, and preferably less than 0.1 mm, more preferably less than 0.09 mm, and even more preferably 0.08 mm or less.

<61>

A method for producing a crystallized sheet or a crystallized film having a relative crystallinity of 80% or more, including the following steps (1) and (2-1):

step (1): cooling a sheet or a film obtained by extruding a polyester resin composition containing a polyester resin and a compound represented by the formula (I) from a die according to an extrusion molding method to a temperature lower than a glass transition temperature (Tg) of the polyester resin composition, to provide a sheet or a film having a relative crystallinity of less than 80%; and step (2-1): heating a sheet or a film obtained in the step (1) to a temperature of equal to or higher than a glass transition temperature (Tg) of the polyester resin composition and lower than a melting point (Tm) of the polyester resin composition, to provide a crystallized sheet or a crystallized film having a relative crystallinity of 80% or more.

<62>

A method for producing a thermoformed article, including the following steps (1) and (2-2):

step (1): cooling a sheet obtained by extruding a polyester resin composition containing a polyester resin and a compound represented by the formula (I) from a die according to an extrusion molding method to a temperature lower than a glass transition temperature (Tg) of the polyester resin composition, to provide a sheet having a relative crystallinity of less than 80%; and step (2-2): thermoforming a sheet obtained in the step (1) within a temperature range of equal to or higher than a glass transition temperature (Tg) and lower than a melting point (Tm) of the polyester resin composition, to provide a crystallized thermoformed article having a relative crystallinity of 80% or more.

<63>

A method for producing a stretched film, including the following steps (1) and (2-3):

step (1): cooling a sheet obtained by extruding a polyester resin composition containing a polyester resin and a compound represented by the formula (I) from a die according to an extrusion molding method to a temperature lower than a glass transition temperature (Tg) of the polyester resin composition, to provide a sheet having a relative crystallinity of less than 80%; and step (2-3): subjecting a sheet obtained in the step (1) to uniaxial stretching or biaxial stretching within a temperature range of equal to or higher than a glass transition temperature (Tg) and equal to or lower than a cold crystallization temperature (Tc) of the polyester resin composition, to provide a crystallized stretched film having a relative crystallinity of 80% or more.

<64>

The method according to any one of <61> to <63>, wherein the step (1) includes melt-kneading a polyester resin composition containing a polyester resin and a compound represented by the formula (I) at a temperature of preferably 170° C. or more, more preferably 175° C. or more, and even more preferably 180° C. or more, and preferably 240° C. or less, more preferably 220° C. or less, and even more preferably 210° C. or less;

thereafter extruding a melt-kneaded mixture from a die in an extruder heated to preferably 170° C. or more, more preferably 175° C. or more, and even more preferably 180° C. or more, and preferably 240° C. or less, more preferably 220° C. or less, and even more preferably 210° C. or less;

subsequently, bringing an extruded mixture into contact with a cooling roller set at a temperature of preferably lower than 40° C., more preferably 30° C. or lower, and even more preferably 20° C. or lower for preferably from 0.1 to 50 seconds, more preferably from 0.5 to 10 seconds, and even more preferably from 0.8 to 5 seconds to cool.

<65>

The method according to <61> or <64>, wherein the step (2-1) includes directly maintaining a sheet or a film obtained in the step (1) to a temperature of preferably 60° C. or higher, and more preferably 70° C. or higher, and preferably 120° C. or lower, and more preferably 110° C. or lower, and holding for preferably from 5 to 60 seconds, more preferably from 7 to 45 seconds, and even more preferably from 10 to 30 seconds.

<66>

The method according to <62> or <64>, wherein the step (2-2) includes setting a sheet obtained in the step (1) in a mold at preferably 70° C. or higher, more preferably 75° C. or higher, and even more preferably 80° C. or higher, and preferably 120° C. or lower, preferably 115° C. or lower, preferably 110° C. or lower, and holding a sheet in a pressed or non-pressed state.

<66>

The method according to <63> or <64>, wherein the step (2-3) includes subjecting a sheet obtained in the step (1) to uniaxial stretching or biaxial stretching at a temperature of preferably 45° C. or higher, more preferably 50° C. or higher, and even more preferably 55° C. or higher, and preferably 80° C. or lower, more preferably 75° C. or lower, and more preferably 70° C. or lower to a thickness of preferably 0.01 mm or more and less than 0.1 mm, more preferably from 0.02 to 0.09 mm, and even more preferably from 0.03 to 0.08 mm.

<67>

The molded article according to any one of <1> to <60>, which is suitable as wrapping containers such as clear cases for daily sundries, cosmetics, household electric appliances, and the like, and transparent windows of paper boxes, or stationeries such as clear plastic holders and ID card cases.

<68>

Use of a molded article as defined in any one of <1> to <50>, in the manufacture of (1) wrapping containers selected from the group consisting of clear cases for manufactured articles selected from daily sundries, cosmetics, and household electric appliances, and transparent windows of paper boxes, or (2) stationeries selected from clear plastic holders and ID card cases.

<69>

Use of a molded article as defined in any one of <1> to <47>, and <51> to <55>, in the manufacture of (1) blister packs or trays for manufactured articles selected from daily sundries, cosmetics, and household electric appliances; (2) food containers; or (3) industrial trays used in transportation or protection of industrial parts.

<70>

Use of a molded article as defined in <1> to <47>, and <56> to <60>, in the manufacture of (1) wrapping materials for manufactured articles selected from daily sundries, cosmetics, and household electric appliances; (2) industrial films, or (3) films for food wrapping.

EXAMPLES

The present invention will be explained more specifically hereinbelow by showing Examples and Comparative Examples, without intending to limit the present invention to the Examples set forth below. Here, parts in Examples are parts by weight, unless specified otherwise. Also, "a normal pressure" means 101.3 kPa, and "an ambient temperature" means a temperature of from 15° to 25° C.

Weight-Average Molecular Weight (Mw) of Polylactic Acid Resin

The weight-average molecular weight (Mw) is measured in accordance with GPC (gel permeation chromatography), under the following measurement conditions.

Measurement Conditions

Column: GMHHR-H+GMHHR-H
Column Temperature: 40° C.
Detector: RI
Eluent: chloroform
Flow Rate: 1.0 mL/min
Sample Concentration: 1 mg/mL
Amount Injected: 0.1 mL
Calculation standard: polystyrene Optical Purity of Polylactic Acid The optical purity of a polylactic acid is measured in accordance with the measurement method for D-form content described in "Poriorefin-toh Gosei-jushi-sei Shokuhin Youki Houso-toh ni Kansuru Jishukijun (Self-Standards Concerning Food Containers and Wrappings Made of Synthetic Resins Such as Polyolefins)," Revised Third Edition, supplemented in June, 2004, Chapter 3 Eisei Shikenho (Hygienic Test Method), p. 12-13" under the following measurement conditions. Specifically, sodium hydroxide in methanol is added to an accurately weighed polylactic acid, and a mixture is set in a water bath shaking machine set at 65° C., and allowed to be hydrolyzed until the resinous components are formed into a homogeneous solution. Further, a diluted hydrochloric acid is added to an alkaline solution after hydrolysis is completed to neutralize, and the hydrolyzed solution is diluted to a certain volume with pure water. Thereafter, a given volume of the dilution is separated in a volumetric flask, and the separated solution is diluted with a mobile phase solution for high-performance liquid chromatography (HPLC). The pH of the dilution is adjusted to a range of from 3 to 7, and the dilution in the volumetric flask is quantified, and filtered with a membrane filter (0.45 μm). The resulting prepared solution is quantified for D-lactic acid and L-lactic acid in accordance with HPLC, whereby optical purity of the polylactic acid resin is obtained.

Measurement Conditions for HPLC

Column: Optically Resolution Column SUMICHIRAL OA6100 (46 mmφ×150 mm, 5 μm), manufactured by Sumika Chemical Analysis Service, Ltd.
Pre-Column: Optically Resolution Column SUMICHIRAL QA6100 (4 mmφ×10 mm, 5 μm), manufactured by Sumika Chemical Analysis Service, Ltd.
Column Temperature: 25° C.
Mobile Phase: 2.5% Methanol-containing 1.5 mM aqueous copper sulfate solution
Flow Rate of Mobile Phase: 1.0 mL/minute
Detector: Ultraviolet Detector (UV 254 nm)
Amount of Injection: 20 μL Melting Points of Polylactic Acid Resins and Polyester Resin Compositions The melting points of the polylactic resins are obtained from an endothermic peak temperature of melt crystallization according to a heating method for measuring differential scanning calorimetry as prescribed in JIS-K7121 (DSC; Diamond DSC, manufactured by PerkinElmer). The melting point is measured by heating from 20° to 250° C. at a heating rate of 10° C./minute.

Acid Value, Hydroxyl Value, and Saponification Value of Polyester-Based Plasticizer Acid Value: The analysis is carried out in accordance with a test method as prescribed in JIS K 0070, except that toluene/ethanol=2/1 (volume ratio) is used as a titration solvent.
Hydroxyl Value: The analysis is carried out in accordance with a test method as prescribed in JIS K 0070, except that acetic acid anhydride/pyridine=1/4 (volume ratio) is used as an acetylation reagent, and that the amount is changed to 3 mL.
Saponification Value: The analysis is carried out in accordance with a test method as prescribed in JIS K 0070, except that the temperature of the water bath is changed to 95° C., and that the heating time is changed to one hour.

Molecular Weight, Terminal Alkyl Esterification Percentage, and Ether Group Value of Polyester-Based Plasticizer Molecular Weight: The molecular weight of the polyester-based plasticizer as used herein means a number-average molecular weight, which is calculated according to the following formulas from an acid value, a hydroxyl value, and a saponification value:

$$\text{Average Molecular weight } M = (M_1 + M_2 - M_3 \times 2) \times n + M_1 - (M_3 - 17.01) \times 2 + (M_3 - 17.01) \times p + (M_2 - 17.01) \times q + 1.01 \times (2 - p - q)$$

$$q = \text{Hydroxyl Value} \times M \div 56110$$

$$2 - p - q = \text{Acid Value} \times M \div 56110$$

$$\text{Average Degree of Polymerization } n = \text{Saponification Value} \times M \div (2 \times 56110) - 1$$

Terminal Alkyl Esterification Percentage: The alkyl esterification percentage at the molecular terminals, i.e. the terminal alkyl esterification percentage, can be calculated by the following formula. The larger the numerical value of the alkyl esterification percentage at the molecular terminals, the small the number of free carboxyl groups and free hydroxyl groups, showing that the molecular terminals are sufficiently subjected to alkyl esterification.

$$\text{Terminal Alkyl Esterification Percentage}(\%) = (p \div 2) \times 100$$

wherein $M_1$: a molecular weight of a dibasic acid ester;
$M_2$: a molecular weight of a dihydric alcohol;
$M_3$: a molecular weight of a monohydric alcohol;
p: the number of terminal alkyl ester groups in one molecule; and
q: the number of terminal hydroxyl groups in one molecule.
Ether Group Value: The ether group value is calculated in units of the number of mmol of the ether groups in one gram of a plasticizer, which is an ester compound, in accordance with the following formula.

$$\text{Ether Group Value}(\text{mmol/g}) = (m-1) \times n \times 1000 \div M$$

wherein m is an average number of repeats of oxyalkylene groups, i.e. m−1 stands for the number of ether groups in one molecule of the dihydric alcohol.

Calculation of SP Value of Polyester-Based Plasticizer

The SP (Solubility Parameter (English in original), solubility parameter) value as used herein means an amount defined by the following formula:

$$\text{SP Value} = (\Delta E / V)^{1/2} (\text{cal}^{1/2} \text{cm}^{-3/2})$$

wherein a cohesive energy is $\Delta E$ and a molecular volume is V. In the present invention, the value is calculated using the method of Fedors described in "*Kothing no Kisokagaku (Fundamental Science of Coating)*" authored by Yuji HARASAKI, p. 4.8, Maki Shoten (1988).

Glass Transition Temperature and Cold Crystallization Temperature of Polyester Resin Composition A glass transition temperature, ° C., and a cold crystallization temperature, ° C., are measured as prescribed in JIS K 7121 as follows. A part of a sheet in an amorphous sheet mentioned above is cut out and weighed accurately in an amount of 7.5 mg, and encapsulated in an aluminum pan. Thereafter, the contents are heated from 25° to 200° C. at a heating rate of 15° C./min using DSC apparatus commercially available from PerkinElmer, Diamond DSC.

Production Example 1 of Polyester-Based Plasticizer

A four-necked flask equipped with a stirrer, a thermometer, a dropping funnel, a distillation tube, and a nitrogen blowing tube was charged with 363 g (3.42 mol) of diethylene glycol and 6.6 g of a 28% by weight sodium methoxide-containing methanol solution (sodium methoxide: 0.034 mol) as a catalyst, and methanol was distilled off, while stirring at 120° C. and a normal pressure for 0.5 hours. Thereafter, 1,000 g (6.84 mol) of dimethyl succinate manufactured by Wako Pure Chemical Industries, Ltd. was added dropwise thereto over 3 hours, and the contents were allowed to react at 120° C. and a normal pressure to distill off methanol formed by the reaction. Next, the temperature was cooled to 75° C., and the pressure was gradually dropped from a normal pressure to 6.7 kPa over 1.5 hours, to distill off methanol. Thereafter, the pressure was recovered to a normal pressure, and additional 5.8 g of a 28% by weight sodium methoxide-containing methanol solution (sodium methoxide: 0.030 mol) was added thereto as a catalyst. The pressure was gradually dropped from a normal pressure to 2.9 kPa at 100° C. over 2 hours to distill off methanol. Thereafter, the temperature was cooled to 80° C., 18 g of KYOWAAD 600S manufactured by Kyowa Chemical Industry Co., Ltd. was added thereto, and the mixture was stirred at 80° C. and a pressure of 4.0 kPa for 1 hour, and then filtered under a reduced pressure. The temperature of the filtrate was raised from 70° to 190° C. at a pressure of 0.3 kPa over 1 hour to distill off the residual dimethyl succinate, to provide a yellow liquid at an ambient temperature. Here, the amount of the catalyst used was 0.94 mol per 100 mol of the dicarboxylic acid ester.

Production Example 2 of Polyester-Based Plasticizer

A four-necked flask equipped with a stirrer, a thermometer, a dropping funnel, a distillation tube, and a nitrogen blowing tube was charged with 581 g (5.47 mol) of diethylene glycol and 9.1 g of a 28% by weight sodium methoxide-containing methanol solution (sodium methoxide: 0.047 mol) as a catalyst, and methanol was distilled off, while stirring at 120° C. and a normal pressure for 0.5 hours. Thereafter, 1,200 g (8.21 mol) of dimethyl succinate manufactured by Wako Pure Chemical Industries, Ltd. was added dropwise thereto over 2 hours, and the contents were allowed to react at 120° C. and a normal pressure, to distill off methanol formed by the reaction. Next, the temperature was cooled to 75° C., and the pressure was gradually dropped from a normal pressure to 6.7 kPa over 1.5 hours, to distill off methanol. Thereafter, the pressure was recovered to a normal pressure, and additional 9.8 g of a 28% by weight sodium methoxide-containing methanol solution (sodium methoxide: 0.051 mol) was added thereto as a catalyst. The pressure was gradually dropped from a normal pressure to 2.9 kPa over 2 hours at 100° C., to distill off methanol. Thereafter, the temperature was cooled to 80° C., 28 g of KYOWAAD 600S manufactured by Kyowa Chemical Industry Co., Ltd. was added thereto, and the mixture was stirred at 80° C. and a pressure of 4.0 kPa for 1 hour, and then filtered under a reduced pressure. The temperature of the filtrate was raised from 70° to 170° C. at a pressure of 0.3 kPa over 2.5 hours to distill off the residual dimethyl succinate, to provide a yellow liquid at an ambient temperature. Here, the amount of the catalyst used was 1.2 mol per 100 mol of the dicarboxylic acid ester.

Production Example 3 of Polyester-Based Plasticizer

A four-necked flask equipped with a stirrer, a thermometer, a dropping funnel, a distillation tube, and a nitrogen blowing tube was charged with 521 g (6.84 mol) of 1,3-propanediol and 5.9 g of a 28% by weight sodium methoxide-containing methanol solution (sodium methoxide: 0.031 mol) as a catalyst, and methanol was distilled off, while stirring at 120° C. and a normal pressure for 0.5 hours. Thereafter, 1,500 g (10.26 mol) of dimethyl succinate manufactured by Wako Pure Chemical Industries, Ltd. was added dropwise thereto over 1 hour, and the contents were allowed to react at 120° C. and a normal pressure to distill off methanol formed by the reaction. Next, the temperature was cooled to 60° C., and 5.6 g of a 28% by weight sodium methoxide-containing methanol solution (sodium methoxide: 0.029 mol) was added thereto. The temperature was raised to 120° C. over 2 hours, and the pressure was then gradually dropped from a normal pressure to 3.7 kPa over 1 hour, to distill off methanol. Thereafter, the temperature was cooled to 80° C., 18 g of KYOWAAD 600S manufactured by Kyowa Chemical Industry Co., Ltd. was added thereto, and the mixture was stirred at 80° C. and a pressure of 4.0 kPa for 1 hour, and then filtered under a reduced pressure. The temperature of the filtrate was raised from 85° to 194° C. at a pressure of 0.1 kPa over 2.5 hours to distill off the residual dimethyl succinate, to provide a yellow liquid at an ambient temperature. Here, the amount of the catalyst used was 0.58 mol per 100 mol of the dicarboxylic acid ester.

Production Example 4 of Polyester-Based Plasticizer

A four-necked flask equipped with a stirrer, a thermometer, a dropping funnel, a distillation tube, and a nitrogen blowing tube was charged with 764 g (10.0 mol) of 1,2-propanediol and 14.0 g of a 28% by weight sodium methoxide-containing methanol solution (sodium methoxide: 0.073 mol) as a catalyst, and methanol was distilled off, while stirring at 120° C. and a normal pressure for 0.5 hours. Thereafter, 2,200 g (15.05 mol) of dimethyl succinate manufactured by Wako Pure Chemical Industries, Ltd. was added dropwise thereto over 2.5 hours, and the contents were allowed to react at 120° C. and a normal pressure to distill off methanol formed by the reaction. Next, the temperature was cooled to 75° C., and the pressure was gradually dropped from a normal pressure to 6.7 kPa over 0.5 hours, to distill off methanol. Thereafter, the pressure was recovered to a normal pressure, and additional 6.4 g of a 28% by weight sodium methoxide-containing methanol solution (sodium methoxide: 0.033 mol) was added thereto as a catalyst. The pressure was gradually dropped from a normal pressure to 5.3 kPa over 1 hour at 110° C., to distill off methanol. The temperature was cooled to 75° C., the pressure was recovered to a normal pressure, and thereafter, additional 8.4 g of a 28% by weight sodium methoxide-containing methanol solution (sodium methoxide: 0.044 mol) was again added thereto as a catalyst. The pressure was gradually dropped from a normal pressure to 1.6 kPa over 2 hours at 110° C., to distill off methanol. Thereafter, the contents were cooled to 80° C., 47 g of KYOWAAD 600S manufactured by Kyowa Chemical Industry Co., Ltd. was added thereto, and the mixture was stirred at 80° C. and a pressure of 4.0 kPa for 1 hour, and then filtered under a reduced pressure. The temperature of the filtrate was raised from 115° to 200° C. at a pressure of 0.4 kPa over 1 hour to distill off the residual dimethyl succinate, to provide a yellow liquid at an ambient temperature. Here, the amount of the catalyst used was 1.82 mol per 100 mol of the dicarboxylic acid ester.

Production Example 5 of Polyester-Based Plasticizer

A four-necked flask equipped with a stirrer, a thermometer, a dropping funnel, a distillation tube, and a nitrogen blowing tube was charged with 955 g (12.6 mol) of 1,2-propanediol and 15.4 g of a 28% by weight sodium methoxide-containing methanol solution (sodium methoxide: 0.080 mol) as a catalyst, and methanol was distilled off, while stirring at 120° C. and a normal pressure for 0.5 hours. Thereafter, 2,567 g (17.56 mol) of dimethyl succinate manufactured by Wako Pure Chemical Industries, Ltd. was added dropwise thereto over 2 hours, and the contents were allowed to react at 120° C. under a normal pressure to distill off methanol formed by the reaction. Next, the temperature was cooled to 75° C., and the pressure was gradually dropped from a normal pressure to 6.7 kPa over 0.5 hours, to distill off methanol. Thereafter, the pressure was recovered to a normal pressure, and additional 8.1 g of a 28% by weight sodium methoxide-containing methanol solution (sodium methoxide: 0.042 mol) was added thereto as a catalyst. The pressure was gradually dropped from a normal pressure to 5.3 kPa over 1 hour at 110° C., to distill off methanol. The temperature was cooled to 75° C., and the pressure was recovered to a normal pressure, and 10.8 g of a 28% by weight sodium methoxide-containing methanol solution (sodium methoxide: 0.056 mol) was again added thereto as a catalyst. The pressure was gradually dropped from a normal pressure to 1.6 kPa over 4 hours at 110° C., to distill off methanol. Thereafter, the temperature was cooled to 80° C., 47 g of KYOWAAD 600S manufactured by Kyowa Chemical Industry Co., Ltd. was added thereto, and the mixture was stirred at 80° C. and a pressure of 4.0 kPa for 1 hour, and then filtered under a reduced pressure. The temperature of the filtrate was raised from 102° to 200° C. at a pressure of 0.8 kPa over 3 hours to distill off the residual dimethyl succinate, to provide a yellow liquid at an ambient temperature. Here, the amount of the catalyst used was 1.71 mol per 100 mol of the dicarboxylic acid ester.

Production Example 6 of Polyester-Based Plasticizer

A four-necked flask equipped with a stirrer, a thermometer, a distillation tube, and a nitrogen blowing tube was charged with 369 g (3.47 mol) of diethylene glycol and 5.6 g of a 28% by weight sodium methoxide-containing methanol solution (sodium methoxide: 0.029 mol) as a catalyst, and methanol was distilled off, while stirring at 84° C. and a pressure of 3.6 kPa for 0.5 hours. Thereafter, 1,600 g (6.95 mol) of dibutyl succinate obtained in the same manner as in Production Example 10 was added dropwise thereto at a pressure of 2.7 kPa and 79° C. over 2.5 hours, and 1-butanol formed by the reaction was distilled off. Next, the pressure was recovered to a normal pressure, and 2.1 g of a 28% by weight sodium methoxide-containing methanol solution (sodium methoxide: 0.011 mol) was then added thereto. The contents were allowed to react, with gradually raising the temperature and gradually dropping the pressure over 1.5 hours, from a state of 85° C. and 2.1 kPa to a state of 146° C. and 1.1 kPa, to distill off 1-butanol formed by the reaction. Thereafter, the temperature was cooled to 80° C., 11 g of KYOWAAD 600S manufactured by Kyowa Chemical Industry Co., Ltd. was added thereto, and the mixture was stirred at 80° C. and a pressure of 4.0 kPa for 1 hour, and then filtered under a reduced pressure, to provide a yellow liquid at an ambient temperature. Here, the amount of the catalyst used was 0.58 mol per 100 mol of the dicarboxylic acid ester.

Production Example 7 of Polyester-Based Plasticizer

A four-necked flask equipped with a stirrer, a thermometer, a dropping funnel, a distillation tube, and a nitrogen blowing tube was charged with 999 g (9.41 mol) of diethylene glycol and 23.6 g of a 28% by weight sodium methoxide-containing methanol solution (sodium methoxide: 0.122 mol) as a catalyst, and methanol was distilled off, while stirring at 120° C. and a normal pressure (101.3 kPa) for 0.5 hours. Thereafter, 4,125 g (28.2 mol) of dimethyl succinate manufactured by Wako Pure Chemical Industries, Ltd. was added dropwise thereto over 3 hours, and the contents were allowed to react at 120° C. and a normal pressure to distill off methanol formed by the reaction. Next, the temperature was cooled to 75° C., and the pressure was gradually dropped from a normal pressure to 6.7 kPa over 2 hours, to distill off methanol. Thereafter, the pressure was recovered to a normal pressure, and additional 4.4 g of a 28% by weight sodium methoxide-containing methanol solution (sodium methoxide: 0.023 mol) was added thereto as a catalyst. The pressure was gradually dropped from a normal pressure to 2.9 kPa over 2 hours at 100° C., to distill off methanol. Thereafter, the temperature was cooled to 80° C., 41 g of KYOWAAD 600S manufactured by Kyowa Chemical Industry Co., Ltd. was added thereto, and the mixture was stirred at 80° C. and a pressure of 4.0 kPa for 1 hour, and then filtered under a reduced pressure. The temperature of the filtrate was raised from 70° to 190° C. at a pressure of 0.3 kPa over 4 hours to distill off the residual dimethyl succinate, to provide a yellow liquid at an ambient temperature. Here, the amount of the catalyst used was 0.51 mol per 100 mol of the dicarboxylic acid ester.

Production Example 8 of Polyester-Based Plasticizer

A four-necked flask equipped with a stirrer, a thermometer, a dropping funnel, a distillation tube, and a nitrogen blowing tube was charged with 263.5 g (2.53 mol) of neopentyl glycol, 1,500 g (4.05 mol) of bis(2-ethylhexyl) adipate, and 5.6 g of a 28% by weight sodium methoxide-containing methanol solution (sodium methoxide: 0.029 mol) as a catalyst, and the contents were allowed to react at a pressure of 3.7 kPa and 120° C. for 1.5 hours, and concurrently 2-ethylhexanol formed by the reaction was distilled off. Next, the temperature was cooled to 75° C., the pressure was thereafter recovered to a normal pressure, and additional 3.0 g of a 28% by weight sodium methoxide-containing methanol solution (sodium methoxide: 0.016 mol) was added as a catalyst. The temperature was raised from 92° to 160° C. at a pressure of 0.4 kPa over 1 hour to distill off 2-ethylhexanol. Thereafter, the temperature was cooled to 80° C., 19 g of KYOWAAD 600S manufactured by Kyowa Chemical Industry Co., Ltd. was added thereto, and the mixture was stirred at a pressure of 4.0 kPa and 80° C. for 1 hour, and then filtered under a reduced pressure. The temperature of the filtrate was raised from 166° to 214° C. over 2 hours at a pressure of 0.3 kPa to distill off 504 g of the residual bis(2-ethylhexyl) adipate, to provide a yellow liquid at an ambient temperature. The amount of the catalyst used was 1.11 mol per 100 mol of the dicarboxylic acid ester.

Production Example 9 of Polyester-Based Plasticizer

A four-necked flask equipped with a stirrer, a thermometer, a Dean-Stark apparatus, and a nitrogen blowing tube was charged with 2,515 g (19.3 mol) of 2-ethylhexanol manufactured by KANTO CHEMICAL CO., LTD., 877 g (7.43 mol) of succinic acid manufactured by Wako Pure Chemical Industries, Ltd., and 14.1 g (0.0742 mol) of paratoluenesulfonic acid monohydrate manufactured by Wako Pure Chemical Industries, Ltd., and the contents were allowed to react from a state of a pressure of 16 kPa and 80° C. to a state of a pressure of 12 kPa and 90° C. over 7 hours to distill off water. Thereafter, 32 g of KYOWAAD 500SH manufactured by Kyowa Chemical Industry Co., Ltd. was added thereto, and the mixture was stirred at a pressure of 4.0 kPa and 80° C. for 1 hour, and then filtered under a reduced pressure. A four-neck flask equipped with a stirrer, a thermometer, a distillation tube, and a nitrogen blowing tube was charged with the filtrate, and the residual 2-ethylhexanol was distilled off while changing the states from a state of a pressure of 0.7 kPa and 95° C. to a state of a pressure 0.5 kPa and 185° C. Thereafter, 16 g of KYOWAAD 500SH was again added thereto, and the mixture was stirred at a pressure of 4.0 kPa and 80° C. for 1 hour, and then filtered under a reduced pressure, to provide bis(2-ethylhexyl) succinate. Next, a four-necked flask equipped with a stirrer, a thermometer, a dropping funnel, a distillation tube, and a nitrogen blowing tube was charged with 467 g (1.36 mol) of the bis(2-ethylhexyl)

succinate obtained, 250 g (2.36 mol) of diethylene glycol, and 2.2 g of a 28% by weight sodium methoxide-containing methanol solution (sodium methoxide: 0.011 mol) as a catalyst, and the contents were allowed to react at 110° C. while gradually dropping the pressure from 2.7 kPa to 0.9 kPa over 45 minutes, to distill off 2-ethylhexanol formed by the reaction. The temperature was cooled to 80° C., thereafter 1,953 g (5.70 mol) of bis(2-ethylhexyl) succinate and 5.0 g of a 28% by weight sodium methoxide-containing methanol solution (sodium methoxide: 0.026 mol) were again added thereto, and the contents were allowed to react, with gradually dropping the pressure while raising the temperature, from a state of 110° C. and 0.8 kPa to a state of 158° C. and 0.4 kPa over 5.5 hours, to distill off 2-ethylhexanol formed by the reaction. The temperature was then cooled to 80° C., and 10.5 g of KYOWAAD 600S manufactured by Kyowa Chemical Industry Co., Ltd. was added thereto, and the mixture was stirred at a pressure of 4.0 kPa and 80° C. for 1 hour, and then filtered under a reduced pressure. The pressure was gradually dropped while raising the temperature, from a state of 178° C. and 0.3 kPa to a state of 220° C. and 0.1 kPa over 4.5 hours, to distill off the residual bis(2-ethylhexyl) succinate, to provide a yellow liquid at an ambient temperature. The amount of the catalyst used was 0.53 mol per 100 mol of the dicarboxylic acid ester.

Production Example 10 of Polyester-Based Plasticizer

A four-necked flask equipped with a stirrer, a thermometer, a dropping funnel, a distillation tube, and a nitrogen blowing tube was charged with 736.6 g (10.04 mol) of 1,3-propanediol and 17.5 g of a 28% by weight sodium methoxide-containing methanol solution (sodium methoxide: 0.091 mol) as a catalyst, and methanol was distilled off, while stirring at 120° C. and a normal pressure for 0.5 hours. Thereafter, 2,622 g (15.05 mol) of dimethyl succinate manufactured by Wako Pure Chemical Industries, Ltd. was added dropwise thereto over 1 hour, and the contents were allowed to react at 120° C. and a normal pressure to distill off methanol formed by the reaction. Next, the temperature was cooled to 70° C., and 6.2 g of a 28% by weight sodium methoxide-containing methanol solution (sodium methoxide: 0.032 mol) was added thereto. The contents were treated at 100° C. and a pressure of 5.2 kPa over 1 hour, to distill off methanol. The temperature was again cooled to 70° C., and 5.2 g of a 28% by weight sodium methoxide-containing methanol solution (sodium methoxide: 0.027 mol) was added thereto. The contents were treated at 100° C. and a pressure of 1.6 kPa over 1 hour, to distill off methanol. Thereafter, the temperature was cooled to 80° C., 67 g of KYOWAAD 600S manufactured by Kyowa Chemical Industry Co., Ltd. was added thereto, and the mixture was stirred at 80° C. and a pressure of 4.0 kPa for 1 hour, and then filtered under a reduced pressure. The temperature of the filtrate was raised from 135° to 200° C. at a pressure of 0.4 kPa over 1 hour to distill off the residual dimethyl succinate, to provide a yellow liquid at an ambient temperature. Here, the amount of the catalyst used was 1.0 mol per 100 mol of the dicarboxylic acid ester.

Production Example 11 of Polyester-Based Plasticizer

A four-necked flask equipped with a stirrer, a thermometer, a dropping funnel, a distillation tube, and a nitrogen blowing tube was charged with 308 g (3.42 mol) of 1,4-butanediol and 6.6 g of a 28% by weight sodium methoxide-containing methanol solution (sodium methoxide: 0.034 mol) as a catalyst, and methanol was distilled off, while stirring at 120° C. and a normal pressure for 0.5 hours. Thereafter, 750 g (5.13 mol) of dimethyl succinate manufactured by Wako Pure Chemical Industries, Ltd. was added dropwise thereto over 1 hour, and the contents were allowed to react at 120° C. and a normal pressure to distill off methanol formed by the reaction. Next, the temperature was cooled to 75° C., and the pressure was gradually dropped from a normal pressure to 6.7 kPa over 1 hour, to distill off methanol. Thereafter, the pressure was recovered to a normal pressure, and additional 1.7 g of a 28% by weight sodium methoxide-containing methanol solution (sodium methoxide: 0.009 mol) was added thereto as a catalyst. The pressure was gradually dropped from a normal pressure to 2.9 kPa over 1 hour at 100° C., to distill off methanol. The temperature was cooled to 70° C., and 1.7 g of a 28% by weight sodium methoxide-containing methanol solution (sodium methoxide: 0.009 mol) was added thereto. The pressure was gradually dropped from a normal pressure to 2.9 kPa over 1 hour at 100° C., to distill off methanol. Thereafter, 23 g of KYOWAAD 600S manufactured by Kyowa Chemical Industry Co., Ltd. was added thereto, and the mixture was stirred at 90° C. and a pressure of 4.0 kPa for 1 hour, and then filtered under a reduced pressure. The temperature of the filtrate was raised from 85° to 180° C. at a pressure of 0.4 kPa over 1 hour to distill off the residual dimethyl succinate, to provide a yellow liquid at an ambient temperature. Here, the amount of the catalyst used was 1.0 mol per 100 mol of the dicarboxylic acid ester.

The acid value, the hydroxyl value, and the saponification value of the ester-based plasticizer obtained were measured, and the number-average molecular weight, the terminal alkyl esterification percentage, the average degree of polymerization (n), and the ether group value were calculated based on the above formulas. In addition, SP values were also calculated in accordance with the above method. The results are shown in Tables 1 to 2.

TABLE 1

| | Production Method | Raw Materials (Molar Ratio) | $R^1$ | $R^2$ | $R^3$ | m | n | Acid Value (mgKOH/g) |
|---|---|---|---|---|---|---|---|---|
| Production Example 1 | Embodiment 1 | Dimethyl Succinate/Diethylene Glycol (2.0/1) | Methyl | Ethylene | Ethylene | 2 | 2.1 | 0.37 |
| Production Example 2 | Embodiment 1 | Dimethyl Succinate/Diethylene Glycol (1.5/1) | Methyl | Ethylene | Ethylene | 2 | 4.3 | 0.83 |
| Production Example 3 | Embodiment 1 | Dimethyl Succinate/1,3-Propanediol (1.5/1) | Methyl | Ethylene | 1,3-Propylene | 1 | 4.4 | 0.64 |
| Production Example 4 | Embodiment 1 | Dimethyl Succinate/1,2-Propanediol (1.5/1) | Methyl | Ethylene | 1,2-Propylene | 1 | 3.6 | 0.51 |

TABLE 1-continued

| | Production Method | Raw Materials (Molar Ratio) | $R^1$ | $R^2$ | $R^3$ | m | n | Acid Value (mgKOH/g) |
|---|---|---|---|---|---|---|---|---|
| Production Example 5 | Embodiment 1 | Dimethyl Succinate/1,2-Propanediol (1.4/1) | Methyl | Ethylene | 1,2-Propylene | 1 | 6.5 | 0.78 |
| Production Example 6 | Embodiment 1 | Dibutyl Succinate/Diethylene Glycol (2.0/1) | Butyl | Ethylene | Ethylene | 2 | 1.9 | 0.23 |

| | Hydroxyl Value (mgKOH/g) | Saponification Value (mgKOH/g) | Number-Average Molecular Weight | Terminal Alkyl Esterification Percentage (%) | Ether Group Value (mmol/g) | SP Value $cal^{1/2}$ $cm^{-3/2}$ |
|---|---|---|---|---|---|---|
| Production Example 1 | 0.6 | 643.2 | 530 | 99.5 | 3.9 | 10.7 |
| Production Example 2 | 2.8 | 620.4 | 960 | 96.9 | 4.5 | 10.8 |
| Production Example 3 | 1.3 | 719.5 | 840 | 98.5 | 0 | 10.9 |
| Production Example 4 | 8.0 | 716.8 | 720 | 94.8 | 0 | 10.7 |
| Production Example 5 | 6.3 | 713.4 | 1170 | 92.6 | 0 | 10.8 |
| Production Example 6 | 2.4 | 552.7 | 590 | 98.6 | 3.2 | 10.2 |

TABLE 2

| | Production Method | Raw Materials (Molar Ratio) | $R^1$ | $R^2$ | $R^3$ | m | n | Acid Value (mgKOH/g) |
|---|---|---|---|---|---|---|---|---|
| Production Example 7 | Embodiment 1 | Dimethyl Succinate/Diethylene Glycol (3.0/1) | Methyl | Ethylene | Ethylene | 2 | 1.6 | 0.48 |
| Production Example 8 | Embodiment 1 | Bis(2-ethylhexyl) Adipate/Neopentyl Glycol (1.6/1) | 2-Ethylhexyl | 1,4-Butylene | 2,2-Dimethyl-1,3-propylene | 1 | 1.2 | 0.72 |
| Production Example 9 | Embodiment 1 | Bis(2-ethylhexyl) Succinate/Diethylene Glycol (3.0/1) | 2-Ethylhexyl | Ethylene | Ethylene | 2 | 1.4 | 0.06 |
| Production Example 10 | Embodiment 1 | Dimethyl Adipate/1,3-Propanediol (1.5/1) | Methyl | 1,4-Butylene | 1,3-Propylene | 1 | 4.4 | 0.35 |
| Production Example 11 | Embodiment 1 | Dimethyl Succinate/1,4-Butanediol (1.5/1) | Methyl | Ethylene | 1,4-Butylene | 1 | 4.4 | 0.50 |

| | Hydroxyl Value (mgKOH/g) | Saponification Value (mgKOH/g) | Number-Average Molecular Weight | Terminal Alkyl Esterification Percentage (%) | Ether Group Value (mmol/g) | SP Value $cal^{1/2}$ $cm^{-3/2}$ |
|---|---|---|---|---|---|---|
| Production Example 7 | 1.1 | 650.7 | 450 | 99.4 | 3.6 | 10.6 |
| Production Example 8 | 12.8 | 394.6 | 610 | 92.6 | 0 | 9.3 |
| Production Example 9 | 0.7 | 443.9 | 600 | 99.6 | 2.3 | 9.7 |
| Production Example 10 | 4.2 | 608.0 | 990 | 96.0 | 0 | 10.4 |
| Production Example 11 | 3.7 | 668.1 | 900 | 96.6 | 0 | 10.7 |

Examples 1-1 to 1-11 and Comparative Examples 1-1 to 1-4

As a polyester resin composition, raw materials for compositions as listed in Table 3 or 4 were added in a single batch to a twin-screw extruder manufactured by Ikegai Corporation, PCM-45 from a raw material supplying inlet, and melt-kneaded at a rotational speed of 100 r/min and a melt-kneading temperature of 190° C., and the kneaded mixture was strand-cut, to provide pellets of a polylactic acid resin composition. The pellets obtained were dried at 70° C. under a reduced pressure for an entire day, so as to have a water content of 500 ppm or less.

The pellets were melt-kneaded with a T die twin-screw extruder manufactured by The Japan Steel Works, Ltd., TEX44αII, at a rotational speed of 120 r/min and a melt-kneading temperature of 200° C., and a sheet-like composition having a thickness of 0.3 mm was extruded from the T die, and contacted with a cooling roller of which surface temperature was controlled to 20° C. for 2 seconds, to provide an amorphous sheet, thickness: 0.3 mm, having a relative crystallinity of less than 80%. Next, the amorphous sheet was brought into contact for 20 seconds with an annealing roller of which surface temperature was controlled to 80° C., to provide a crystallized sheet, thickness: 0.3 mm, having a relative crystallinity of 80% or more. Here, as to Comparative Example 1-4, the crystallization velocity was slow and crystallization hardly progressed, so that adhesion on an annealing roller was caused, which was sampled to be evaluated in the same manner.

Here, the raw materials in Tables 3 and 4 are as follows.

Polyester Resin

NW4032D: Polylactic acid resin, manufactured by Nature Works LLC, poly-L-lactic acid, Nature Works 4032D, optical purity: 98.5%, melting point: 160° C., weight-average molecular weight: 141,000, residual monomers: 1,200 ppm PET: Polyethylene terephthalate, Tsunami GS2, manufactured by Eastman Chemical Company, glass transition temperature: 81° C.

Plasticizer

Production Examples 1 to 11

Polyester-Based Plasticizers Listed in Tables 1 and 2

DAIFATTY-101: a diester formed between adipic acid and a 1/1 mixture of diethylene glycol monomethyl ether/benzyl alcohol, manufactured by DAIHACHI CHEMICAL INDUSTRY CO., LTD.

CHIRABASOL VR-01: an ester formed between a polyglycerol and oleic acid, manufactured by Taiyo Kagaku Co., Ltd.

Crystal Nucleating Agent

SLIPACKS H: Ethylenebis 12-hydroxystearamide, manufactured by Nippon Kasei Chemical Co., Ltd.

Hydrolysis Inhibitor

Carbodilite LA-1: Polycarbodiimide, manufactured by Nisshinbo Chemical Inc.

The physical properties of the resulting molded articles were evaluated in accordance with the methods of the following Test Examples 1-1 to 1-4. Also, the fuming property during molding was evaluated in accordance with a method of Test Example 1-5. The results are shown in Tables 3 and 4.

Test Example 1-1

Evaluation of Crystallinity

A molded sheet was accurately weighed in an amount of 7.5 mg, and encapsulated in an aluminum pan. Using a DSC apparatus (Diamond DSC, manufactured by PerkinElmer), the 1st RUN included heating from 20° to 200° C. at a heating rate of 20° C./minute, keeping at 200° C. for 5 minutes, cooling from 200° to 20° C. at a cooling rate of −20° C./minute, and keeping at 20° C. for 1 minute, and further, the 2nd RUN included heating from 20° to 200° C. at a heating rate of 20° C./minute. ΔHcc, an absolute value of a cold crystallization enthalpy of a polylactic acid resin observed in 1st RUN, and ΔHm, a melt crystallization enthalpy observed in 2nd RUN, were obtained, and from the found values a relative crystallinity (%) was calculated by the following formula:

Relative Crystallinity(%)={(ΔHm−ΔHcc)/ΔHm}×100

Test Example 1-2

Transparency

As to the molded sheet, a Haze value was measured using a spectrophotometric transmittance meter with an integrating sphere, haze meter, as prescribed in JIS-K7105. The smaller the number, the more excellent the transparency.

Test Example 1-3

Heat Resistance

As to the molded sheet, a weight loss percentage (%) was measured under conditions that the molded sheet was accurately weighed in an amount of from 7.0 to 8.0 mg, heated from 40° to 210° C. at a heating rate of 40° C./min under air stream flow (200 mL/min) using a thermal analyzer EXTRA TG/DTA 7200, manufactured by SII Nano Technology Company, and held at 210° C. for 30 minutes, used as a measure of heat resistance. The smaller the weight loss percentage (%), the more excellent the heat resistance.

Test Example 1-4

Bleeding Resistance

As to the molded sheet having dimensions of a length of 100 mm×a width of 100 mm, the molded sheet was allowed to stand for one week in a thermostat kept at 70° C., and the presence or absence of bleed-out of the plasticizer on the surface was visually observed. The bleeding properties were evaluated in the following 3 ranks by visual examination and hand feel:
3: No bleeding is found.
2: Slight bleeding is found.
1: Evident bleeding is found.

Test Example 1-5

Fuming Resistance

The presence or absence of fuming property from an extrusion molding machine was observed, and the fuming resistance was evaluated in 3 ranks depending upon its degree. The small the number, the smaller the fumes, and the more excellent the operability and less loss in the amount of the plasticizer.
3: No fuming is found.
2: Slight fuming is found.
1: Evident fuming is found.

TABLE 3

|  |  | Examples |  |  |  |  |  |  | Comparative Examples |  |  |  |
|---|---|---|---|---|---|---|---|---|---|---|---|---|
|  |  | 1 | 2 | 3 | 4 | 5 | 6 | 7 | 1 | 2 | 3 | 4 |
| Polyester Resin | NW 4032D | 100 | 100 | 100 | 100 | 100 | 100 | 100 | 100 | 100 | 100 | 100 |

TABLE 3-continued

|  |  | Examples | | | | | | | Comparative Examples | | | |
|---|---|---|---|---|---|---|---|---|---|---|---|---|
|  |  | 1 | 2 | 3 | 4 | 5 | 6 | 7 | 1 | 2 | 3 | 4 |
| Plasticizer | Production Example 1 | 10 | — | — | — | — | — | — | — | — | — | — |
|  | Production Example 2 | — | 10 | — | — | — | — | — | — | — | — | — |
|  | Production Example 3 | — | — | 10 | — | — | — | — | — | — | — | — |
|  | Production Example 4 | — | — | — | 10 | — | — | — | — | — | — | — |
|  | Production Example 5 | — | — | — | — | 10 | — | — | — | — | — | — |
|  | Production Example 6 | — | — | — | — | — | 10 | — | — | — | — | — |
|  | Production Example 7 | — | — | — | — | — | — | 10 | — | — | — | — |
|  | Production Example 8 | — | — | — | — | — | — | — | 10 | — | — | — |
|  | Production Example 9 | — | — | — | — | — | — | — | — | 10 | — | — |
|  | DAIFATTY-101 | — | — | — | — | — | — | — | — | — | 10 | — |
|  | CHIRABASOL VR-01 | — | — | — | — | — | — | — | — | — | — | 10 |
| Crystal Nucleating Agent | SLIPACKS H | 0.4 | 0.4 | 0.4 | 0.4 | 0.4 | 0.4 | 0.4 | 0.4 | 0.4 | 0.4 | 0.4 |
| Hydrolysis Inhibitor | Carbodilite LA-1 | 0.2 | 0.2 | 0.2 | 0.2 | 0.2 | 0.2 | 0.2 | 0.2 | 0.2 | 0.2 | 0.2 |
| Polyester Resin Composition | Glass Transition Temp., Tg, °C. | 44.2 | 45.6 | 44.4 | 46.4 | 47.0 | 42.1 | 42.4 | 44.3 | 43.4 | 40.2 | 57.8 |
|  | Cold Crystallization Temp., Tc, °C. | 77.9 | 78.8 | 78.9 | 79.5 | 80.5 | 75.7 | 76.9 | 76.6 | 76.1 | 74.8 | 92.6 |
|  | Melting Point, Tm, °C. | 163 | 162 | 164 | 162 | 162 | 163 | 162 | 162 | 162 | 162 | 164 |
| Extrusion Molding | Fuming Resistance | 3 | 3 | 3 | 3 | 3 | 3 | 3 | 3 | 3 | 1 | 3 |
| Sheet in Amorphous State or Semi-Crystalline State | Relative Crystallinity, % | 53 | 54 | 51 | 50 | 50 | 53 | 51 | 50 | 54 | 51 | 33 |
|  | Transparency, Haze % | 1.3 | 1.3 | 1.2 | 1.3 | 1.3 | 1.5 | 1.3 | 1.2 | 1.5 | 1.5 | 59.1 |
|  | Heat Resistance, Weight Loss Percentage % | 3.5 | 2.9 | 1.9 | 2.2 | 2.8 | 2.2 | 5.4 | 4.0 | 2.3 | 8.7 | 1.8 |
|  | Bleeding Resistance | 3 | 3 | 3 | 3 | 3 | 3 | 3 | 1 | 1 | 3 | 1 |
| Crystallized Sheet | Relative Crystallinity, % | 100 | 100 | 100 | 100 | 100 | 100 | 100 | 100 | 100 | 100 | 60 |
|  | Transparency, Haze % | 4.0 | 4.0 | 3.6 | 3.9 | 3.8 | 3.9 | 4.9 | 10.9 | 6.5 | 6.1 | 60.2 |
|  | Heat Resistance, Weight Loss Percentage % | 3.4 | 2.9 | 1.7 | 2.0 | 2.1 | 1.9 | 4.8 | 3.9 | 1.9 | 7.8 | 1.8 |
|  | Bleeding Resistance | 3 | 3 | 3 | 3 | 3 | 3 | 3 | 1 | 1 | 3 | 1 |

\* The amounts of the raw materials are expressed in parts by weight.
\*\* No. of Examples and Comparative Examples mean Examples 1-1 to 1-7, and Comparative Examples 1-1 to 1-4.

TABLE 4

|  |  | Examples | | | |
|---|---|---|---|---|---|
|  |  | 8 | 9 | 10 | 11 |
| Polyester Resin | NW 4032D | 100 | 100 | — | 100 |
|  | PET | — | — | 100 | — |
| Plasticizer | Production Example 10 | 10 | — | — | — |
|  | Production Example 11 | — | 10 | — | — |
|  | Production Example 1 | — | — | 10 | 10 |
| Crystal Nucleating Agent | SLIPACKS H | 0.4 | 0.4 | 0.4 | 0.4 |
| Hydrolysis Inhibitor | Carbodilite LA-1 | 0.2 | 0.2 | 0.2 | — |
| Polyester Resin Composition | Glass Transition Temp., Tg, °C. | 44.2 | 45.6 | 59.4 | 46.4 |
|  | Cold Crystallization Temp., Tc, °C. | 77.9 | 78.8 | 88.9 | 79.5 |
|  | Melting Point, Tm, °C. | 163 | 162 | 164 | 162 |
| Extrusion Molding | Fuming Resistance | 3 | 3 | 3 | 3 |
| Sheet in Amorphous State or Semi-Crystalline State | Relative Crystallinity, % | 53 | 54 | 51 | 50 |
|  | Transparency, Haze % | 1.3 | 1.3 | 1.2 | 1.3 |
|  | Heat Resistance, Weight Loss Percentage % | 3.5 | 2.9 | 1.9 | 2.2 |
|  | Bleeding Resistance | 3 | 3 | 3 | 3 |
| Crystallized Sheet | Relative Crystallinity, % | 100 | 100 | 100 | 100 |
|  | Transparency, Haze % | 4.0 | 4.0 | 4.3 | 3.9 |
|  | Heat Resistance, Weight Loss Percentage % | 3.4 | 2.9 | 1.7 | 2.0 |
|  | Bleeding Resistance | 3 | 3 | 3 | 3 |

\* The amounts of the raw materials are expressed in parts by weight.
\*\* No. of Examples mean Examples 1-8 to 1-11.

As is clear from the results of Tables 3 and 4, the plasticizers represented by the formula (I) had excellent compatibility with the polylactic acid resin and the polyethylene terephthalate, and had high plasticizing effects, so that the sheets of the present invention showed excellent transparency and also excellent bleeding resistance, and showed a high crystallinity when crystallized. In addition, since the plasticizers mentioned above themselves had high heat resistance, fuming during extrusion molding was also controlled, so that operability was excellent, and the heat resistance of the sheet, a molded article thereof, was also excellent. On the other hand, the plasticizer used in Comparative Example 1-4 had worsened compatibility with the resin, and the plasticizer even when in an amorphous state had worsened transparency, so that the crystallization after the crystallization was low. In addition, the plasticizers used in Comparative Examples 1-1 and 1-2 were insufficient in compatibility with the resin, so that bleed-out was observed during storage. While Comparative Example 1-3 had excellent transparency and bleeding resistance, and had a high crystallinity when crystallized, the heat resistance of the plasticizer was insufficient, so that fuming took place during extrusion molding, and the heat resistance of the sheet obtained was worsened.

Examples 2-1 to 2-11 and Comparative Examples 2-1 to 2-4

As a polyester resin composition, raw materials for compositions as listed in Tables 5 and 6 were added in a single batch to a twin-screw extruder manufactured by Ikegai Corporation, PCM-45 from a raw material supplying inlet, and melt-kneaded at a rotational speed of 100 r/min and a melt-kneading temperature of 190° C., and the kneaded mixture was strand-cut, to provide pellets of a polylactic acid resin composition. The pellets obtained were dried at 70° C. under a reduced pressure for an entire day, so as to have a water content of 500 ppm or less.

Preparation of Sheet in Amorphous State

The pellets were melt-kneaded with a T die twin-screw extruder manufactured by The Japan Steel Works, Ltd., TEX44αII, at a rotational speed of 120 r/min and a melt-kneading temperature of 200° C., and a sheet-like composition having a thickness of 0.3 mm was extruded from the T die, and contacted with a cooling roller of which surface temperature was controlled to 20° C. for 2 seconds, to provide an amorphous sheet, thickness: 0.3 mm, having a relative crystallinity of less than 80%.

Preparation of Thermoformed Articles

Next, with a single-step vacuum pressure molding machine manufactured by WAKISAKA Co., Ltd., FVS-500P WAK-ITEC, the above-mentioned cut-out sheet in an amorphous state was placed along the guide, and the temperature of the sheet surface was controlled to from 70° to 90° C. by varying a holding time in a heater section in which a heater temperature was set at 400° C. to heat and soften the sheet to a thermoformable state. Thereafter, the sheet was subjected to vacuum molding with upper and lower molds of which surface temperatures were set at 90° C., and the sheet was held in the mold for 10 seconds, and thereafter demolded, to provide a thermoformed article. As the temperature of the sheet surface, the sheet surface temperature after heating was directly measured with a surface thermometer. Here, the mold used is shown in FIG. 1.

Here, the raw materials in Tables 5 and 6 are as follows.

Polyester Resin

NW4032D: Polylactic acid resin, manufactured by Nature Works LLC, poly-L-lactic acid, Nature Works 4032D, optical purity: 98.5%, melting point: 164° C., weight-average molecular weight: 141,000, residual monomers: 1,200 ppm PET: Polyethylene terephthalate, Tsunami GS2, manufactured by Eastman Chemical Company, glass transition temperature: 81° C.

Plasticizer

Production Examples 1 to 11

Polyester-based Plasticizers Listed in Tables 1 and 2

RIKEMAL PL-019: Glycerol diacetomonocaprylate, manufactured by RIKEN VITAMIN CO., LTD.

ATBC: Acetyl tributyl citrate manufactured by ASAHI KASEI FINECHEM CO., LTD.

Crystal Nucleating Agent

SLIPACKS H: Ethylenebis 12-hydroxystearamide, manufactured by Nippon Kasei Chemical Co., Ltd.

Hydrolysis Inhibitor

Carbodilite LA-1: Polycarbodiimide, manufactured by Nisshinbo Chemical Inc.

The physical properties of the resulting molded articles were evaluated in accordance with the methods of the following Test Examples 2-1 to 2-5. The results are shown in Tables 5 and 6.

Test Example 2-1

Evaluation of Crystallinity

A sheet in an amorphous state and a thermoformed article were accurately weighed in an amount of 7.5 mg, and encapsulated in an aluminum pan. Using a DSC apparatus (Diamond DSC, manufactured by PerkinElmer), the 1st RUN included heating from 20° to 200° C. at a heating rate of 20° C./minute, keeping at 200° C. for 5 minutes, cooling from 200° to 20° C. at a cooling rate of −20° C./minute, and keeping at 20° C. for 1 minute, and further, the 2nd RUN included heating from 20° to 200° C. at a heating rate of 20° C./minute. ΔHcc, an absolute value of a cold crystallization enthalpy of a polylactic acid resin observed in 1st RUN, and ΔHm, a melt crystallization enthalpy observed in 2nd RUN, were obtained, and from the found values a relative crystallinity (%) was calculated by the following formula:

$$\text{Relative Crystallinity}(\%) = \{(\Delta Hm - \Delta Hcc)/\Delta Hm\} \times 100$$

Test Example 2-2

Evaluation of Transparency

Parts of the sheet in an amorphous state and the thermoformed article were cut out, and Haze values were measured using a spectrophotometric transmittance meter with an integrating sphere, haze meter, Model HM-150, manufactured by MURAKAMI COLOR RESEARCH LABORATORY CO., Ltd., as prescribed in JIS-K7105, and used as indexes for transparency. The smaller the values of Haze value, the more excellent the transparency.

Test Example 2-3

Evaluation of Heat Resistance

Water at 25° C. was placed in an amount of 50 cc in a body part having ϕ81 mm, a height of 51 mm made of PP-containing low-foamable PS of a commercially available vessel under the trade name of SHINO Yunomi 90, manufactured by C P CHEMICAL INCORPORATED, and the body part was fit tightly with a thermoformed article, a lid, obtained. The lidded vessel was heated in a microwave oven at 600 W for 60 seconds, and heat resistance was evaluated in the following 3 ranks. Here, the surface temperature of the thermoformed article immediately after the test was 95° C.

3: There are hardly any deformations.
2: There are minor deformations.
1: There are large deformations.

Test Example 2-4

Evaluation of Bleeding Resistance

A thermoformed article was allowed to stand for one week in a thermostat kept at 70° C., and the presence or absence of bleed-out of the plasticizer on the surface was visually observed. The bleeding resistance was evaluated in the following 3 ranks by visual examination and hand feel:
3: No bleeding is found.
2: Slight bleeding is found.
1: Evident bleeding is found.

Test Example 2-5

Evaluation of Rigidity—Elasticity

A sample piece having a width of 1 cm and a length of 4 cm was cut out from a flat portion of a top side of a thermoformed article, and a storage modulus E' in a temperature region of from −20° to 80° C. was measured at a frequency of 10 Hz and a heating rate of 2° C./min with a dynamic viscoelasticity measurement instrument manufactured by SII Nano Technology Inc., EXSTAR6000, to obtain a storage modulus (GPa) at 25° C., as prescribed in JIS-K7198.

TABLE 6

|  |  | Examples | | | |
|---|---|---|---|---|---|
|  |  | 8 | 9 | 10 | 11 |
| Polyester Resin | NW 4032D | 100 | 100 | — | 100 |
|  | PET | — | — | 100 | 13 |
| Plasticizer | Production Example 10 | 5 | — | — | — |
|  | Production Example 11 | — | 5 | — | — |
|  | Production Example 1 | — | — | 5 | 5 |
| Crystal Nucleating Agent | SLIPACKS H | 0.4 | 0.4 | 0.4 | 0.4 |
| Hydrolysis Inhibitor | Carbodilite LA-1 | 0.2 | 0.2 | 0.2 | — |
| Polyester Resin Composition | Glass Transition Temp., Tg, ° C. | 51 | 52 | 72 | 52 |
|  | Cold Crystallization Temp., Tc, ° C. | 82 | 83 | 93 | 83 |
|  | Melting Point, Tm, ° C. | 163 | 163 | 163 | 163 |
| Sheet in Amorphous State or Semi-Crystalline State | Relative Crystallinity, % | 52 | 53 | 51 | 51 |
|  | Transparency, Haze % | 1.3 | 1.3 | 1.2 | 1.2 |
| Thermoformed Article | Relative Crystallinity, % | 100 | 100 | 100 | 100 |
|  | Transparency, Haze % | 4.0 | 3.8 | 4.3 | 3.7 |
|  | Heat Resistance | 3 | 3 | 3 | 3 |
|  | Bleeding Resistance | 3 | 3 | 3 | 3 |
|  | Modulus, GPa | 3.7 | 3.7 | 2.1 | 3.6 |

\* The amounts of the raw materials are expressed in parts by weight.
\*\* No. of Examples mean Examples 2-8 to 2-11.

As is clear from the results of Tables 5 and 6, the plasticizers represented by the formula (I) had excellent compatibility with the polylactic acid resin and the polyethylene terephthalate, and had high plasticizing effects, so that the thermo-

TABLE 5

|  |  | Examples | | | | | | | Comparative Examples | | | |
|---|---|---|---|---|---|---|---|---|---|---|---|---|
|  |  | 1 | 2 | 3 | 4 | 5 | 6 | 7 | 1 | 2 | 3 | 4 |
| Polyester Resin | NW 4032D | 100 | 100 | 100 | 100 | 100 | 100 | 100 | 100 | 100 | 100 | 100 |
| Plasticizer | Production Example 1 | 5 | — | — | — | — | — | — | — | — | — | — |
|  | Production Example 2 | — | 5 | — | — | — | — | — | — | — | — | — |
|  | Production Example 3 | — | — | 5 | — | — | — | — | — | — | — | — |
|  | Production Example 4 | — | — | — | 5 | — | — | — | — | — | — | — |
|  | Production Example 5 | — | — | — | — | 5 | — | — | — | — | — | — |
|  | Production Example 6 | — | — | — | — | — | 5 | — | — | — | — | — |
|  | Production Example 7 | — | — | — | — | — | — | 5 | — | — | — | — |
|  | Production Example 8 | — | — | — | — | — | — | — | 5 | — | — | — |
|  | Production Example 9 | — | — | — | — | — | — | — | — | 5 | — | — |
|  | RIKEMAL PL-019 | — | — | — | — | — | — | — | — | — | 5 | — |
|  | ATBC | — | — | — | — | — | — | — | — | — | — | 5 |
| Crystal Nucleating Agent | SLIPACKS H | 0.4 | 0.4 | 0.4 | 0.4 | 0.4 | 0.4 | 0.4 | 0.4 | 0.4 | 0.4 | 0.4 |
| Hydrolysis Inhibitor | Carbodilite LA-1 | 0.2 | 0.2 | 0.2 | 0.2 | 0.2 | 0.2 | 0.2 | 0.2 | 0.2 | 0.2 | 0.2 |
| Polyester Resin Composition | Glass Transition Temp., Tg, ° C. | 51 | 52 | 52 | 52 | 53 | 51 | 50 | 52 | 51 | 47 | 48 |
|  | Cold Crystallization Temp., Tc, ° C. | 82 | 83 | 83 | 83 | 84 | 81 | 81 | 81 | 80 | 79 | 79 |
|  | Melting Point, Tm, ° C. | 163 | 163 | 163 | 163 | 163 | 163 | 162 | 163 | 163 | 160 | 160 |
| Sheet in Amorphous State or Semi-Crystalline State | Relative Crystallinity, % | 52 | 53 | 51 | 51 | 53 | 55 | 51 | 58 | 55 | 51 | 52 |
|  | Transparency, Haze % | 1.3 | 1.3 | 1.2 | 1.2 | 1.2 | 1.5 | 1.2 | 1.3 | 1.5 | 3.8 | 4.0 |
| Thermoformed Article | Relative Crystallinity, % | 100 | 100 | 100 | 100 | 100 | 100 | 100 | 99 | 100 | 100 | 100 |
|  | Transparency, Haze % | 4.0 | 3.8 | 3.4 | 3.7 | 3.6 | 3.7 | 4.7 | 10.8 | 9.6 | 9.6 | 9.8 |
|  | Heat Resistance | 3 | 3 | 3 | 3 | 3 | 3 | 3 | 3 | 3 | 2 | 2 |
|  | Bleeding Resistance | 3 | 3 | 3 | 3 | 3 | 3 | 3 | 1 | 1 | 2 | 1 |
|  | Modulus, GPa | 3.6 | 3.7 | 3.7 | 3.7 | 3.8 | 3.6 | 3.4 | 3.7 | 3.6 | 2.8 | 3.1 |

\* The amounts of the raw materials are expressed in parts by weight
\*\* No. of Examples and Comparative Examples mean Examples 2-1 to 2-7, and Comparative Examples 2-1 to 2-4.

formed articles of the present invention showed high crystallinity and excellent transparency and also had excellent heat resistance and bleeding resistance. In addition, the thermoformed articles containing the plasticizers mentioned above had high moduli and excellent rigidity. On the other hand, the plasticizers used in Comparative Examples 2-3 and 2-4 had worsened compatibility with the resin, the plasticizers were worse in transparency than those of inventive articles, and bleed-out was observed during storage, and further the lowering in the modulus was large. Also, the plasticizers used in Comparative Examples 2-1 and 2-2 had insufficient compatibility with the resin, and also lowered in transparency, and bleed-out was observed during storage.

In addition, as to the thermoformed articles of the present invention, the thermoforming property was evaluated in accordance with the following Test Example 2-6. The results are shown in Tables 7 and 8.

Test Example 2-6

Evaluation of Thermoforming Property

The thermoforming property was evaluated as follows. With a single-step vacuum pressure molding machine manufactured by WAKISAKA Co., Ltd., FVS-500P WAKITEC, the above-mentioned sheet in an amorphous state was placed along the guide, and the temperature of the sheet was raised until attaining a temperature listed in Table 7 or 8 by varying a holding time in a heater section in which a heater temperature was set to 400° C. Thereafter, the sheet heated to each temperature was subjected to vacuum molding with upper and lower molds of which surface temperatures were set at 90° C., and the sheet was held in the mold for 10 seconds, and thereafter vacuum molded article was demolded. A case where a vacuum molded article could be easily fitted was "A," and others were "B." As to the temperature of the sheet surface was measured, the surface temperature of the sheet after heating was measured directly with a surface thermometer. Here, the mold used is the same as above.

TABLE 7

|  |  |  |  | Examples |  |  |  |  |  |  | Comparative Examples |  |  |  |
|---|---|---|---|---|---|---|---|---|---|---|---|---|---|---|
|  |  |  |  | 1 | 2 | 3 | 4 | 5 | 6 | 7 | 1 | 2 | 3 | 4 |
| Polyester Resin | NW 4032D |  |  | 100 | 100 | 100 | 100 | 100 | 100 | 100 | 100 | 100 | 100 | 100 |
| Plasticizer | Production Example 1 |  |  | 5 | — | — | — | — | — | — | — | — | — | — |
|  | Production Example 2 |  |  | — | 5 | — | — | — | — | — | — | — | — | — |
|  | Production Example 3 |  |  | — | — | 5 | — | — | — | — | — | — | — | — |
|  | Production Example 4 |  |  | — | — | — | 5 | — | — | — | — | — | — | — |
|  | Production Example 5 |  |  | — | — | — | — | 5 | — | — | — | — | — | — |
|  | Production Example 6 |  |  | — | — | — | — | — | 5 | — | — | — | — | — |
|  | Production Example 7 |  |  | — | — | — | — | — | — | 5 | — | — | — | — |
|  | Production Example 8 |  |  | — | — | — | — | — | — | — | 5 | — | — | — |
|  | Production Example 9 |  |  | — | — | — | — | — | — | — | — | 5 | — | — |
|  | R1KEMAL PL-019 |  |  | — | — | — | — | — | — | — | — | — | 5 | — |
|  | ATBC |  |  | — | — | — | — | — | — | — | — | — | — | 5 |
| Crystal Nucleating Agent | SLIPACKS H |  |  | 0.4 | 0.4 | 0.4 | 0.4 | 0.4 | 0.4 | 0.4 | 0.4 | 0.4 | 0.4 | 0.4 |
| Hydrolysis Inhibitor | Carbodilite LA-1 |  |  | 0.2 | 0.2 | 0.2 | 0.2 | 0.2 | 0.2 | 0.2 | 0.2 | 0.2 | 0.2 | 0.2 |
| Vacuum Molded Article | Fittability | Surface Temp. of Sheet, ° C. | 70 | B | B | B | B | B | B | B | B | B | B | B |
|  |  |  | 73 | A | B | B | B | B | A | A | B | B | B | B |
|  |  |  | 76 | A | A | A | A | B | A | A | B | B | A | A |
|  |  |  | 79 | A | A | A | A | A | A | A | B | A | A | A |
|  |  |  | 82 | A | A | A | A | A | A | B | A | A | B | B |
|  |  |  | 85 | B | A | A | A | A | B | B | A | B | B | B |
|  |  |  | 88 | B | A | A | A | B | B | B | B | B | B | B |
|  |  |  | 91 | B | B | B | B | A | B | B | B | B | B | B |
|  |  |  | 94 | B | B | B | B | A | B | B | B | B | B | B |
|  |  |  | 97 | B | B | B | B | B | B | B | B | B | B | B |

\* The amounts of the raw materials are expressed in parts by weight.
\*\* No. of Examples and Comparative Examples mean Examples 2-1 to 2-7, and Comparative Examples 2-1 to 2-4.

TABLE 8

|  |  |  |  | Examples |  |  |  |
|---|---|---|---|---|---|---|---|
|  |  |  |  | 8 | 9 | 10 | 11 |
| Polyester Resin | NW 4032D |  |  | 100 | 100 | — | 100 |
|  | PET |  |  | — | — | 100 | — |
| Plasticizer | Production Example 10 |  |  | 5 | — | — | — |
|  | Production Example 11 |  |  | — | 5 | — | — |
|  | Production Example 1 |  |  | — | — | 5 | 5 |
| Crystal Nucleating Agent | SLIPACKS H |  |  | 0.4 | 0.4 | 0.4 | 0.4 |
| Hydrolysis Inhibitor | Carbodilite LA-1 |  |  | 0.2 | 0.2 | 0.2 | — |
| Vacuum Molded Article | Fittability | Surface Temp. of Sheet, ° C. | 70 | B | B | B | B |
|  |  |  | 73 | A | B | B | B |
|  |  |  | 76 | A | A | B | A |
|  |  |  | 79 | A | A | B | A |
|  |  |  | 82 | A | A | A | A |
|  |  |  | 85 | B | A | A | A |
|  |  |  | 88 | B | A | A | A |
|  |  |  | 91 | B | B | A | B |
|  |  |  | 94 | B | B | A | B |
|  |  |  | 97 | B | B | B | B |

\* The amounts of the raw materials are expressed in parts by weight.
\*\* No. of Examples mean Examples 2-8 to 2-11.

As is clear from the results of Tables 7 and 8, the plasticizers represented by the formula (I) had excellent compatibility with the polylactic acid resin and the polyethylene terephthalate, the resin compositions containing the plasticizers represented by the formula (I) had wide temperature region (moldable temperature range) for obtaining sufficient fittability even when the temperatures of the sheet surface changed with the different holding time periods in the heating zone, thereby having excellent thermoforming property.

Examples 3-1 to 3-10 and Comparative Examples 3-1 to 3-5

Preparation of Polyester Resin Composition

As a polyester resin composition, raw materials for compositions as listed in Tables 9 and 10 were added in a single batch to a twin-screw extruder manufactured by Ikegai Corporation, PCM-45 from a raw material supplying inlet, and melt-kneaded at a rotational speed of 100 r/min and a melt-kneading temperature of 190° C., and the kneaded mixture was strand-cut, to provide pellets of a polylactic acid resin composition. The pellets obtained were dried at 70° C. under a reduced pressure for an entire day, so as to have a water content of 500 ppm or less.

Preparation of Sheet in Amorphous State

The pellets were melt-kneaded with a T die twin-screw extruder manufactured by The Japan Steel Works, Ltd., TEX44αII, at a rotational speed of 120 r/min and a melt-kneading temperature of 200° C., and a sheet-like composition having a thickness of 0.3 mm was extruded from the T die, and contacted with a cooling roller of which surface temperature was controlled to 20° C. for 2 seconds, to provide an amorphous sheet, thickness: 0.3 mm, having a relative crystallinity of less than 80%.

Preparation of Biaxially Stretched Film

Next, the sheet in an amorphous state of each of the compositions was cut out into a square shape of 12 cm×12 cm with a thickness of 0.2 mm, and subjected to a biaxial simultaneous stretching to a stretching fold of 10.2 times with a table tenter testing machine manufactured by Iwamoto Seisakusho, under the conditions of a stretching temperature of from 55° to 60° C., and 80° C. for Comparative Example 3-5 only, an afterheat time of 45 seconds, a stretching rate of 5 mm/s, and a holding time of 3 minutes with a stretching range being a square of 10 cm×10 cm, to prepare a biaxially stretched film having a thickness of 22 μm.

Here, the raw materials in Tables 9 and 10 are as follows.

Polyester Resin

NW4032D: Polylactic acid resin, manufactured by Nature Works LLC, poly-L-lactic acid, Nature Works 4032D, optical purity: 98.5%, melting point: 164° C., weight-average molecular weight: 141,000, residual monomers: 1,200 ppm PET: Polyethylene terephthalate, Tsunami GS2, manufactured by Eastman Chemical Company, glass transition temperature: 81° C.

Plasticizer

Production Examples 1 to 11

Polyester-based Plasticizers Listed in Tables 1 and 2

POEM G-048: Glycerol diacetomonooleate, manufactured by RIKEN VITAMIN CO., LTD.

POEM G-0021: Decaglycerol laurate, manufactured by RIKEN VITAMIN CO., LTD.

The properties of the resulting molded articles were evaluated in accordance with the methods of the following Test Examples 3-1 to 3-4. The results are shown in Tables 9 and 10.

Test Example 3-1

Evaluation of Crystallinity

A sheet in an amorphous state and a biaxially stretched film were accurately weighed in an amount of 7.5 mg, and encapsulated in an aluminum pan. Using a DSC apparatus (Diamond DSC, manufactured by PerkinElmer), the 1st RUN included heating from 20° to 200° C. at a heating rate of 20° C./minute, keeping at 200° C. for 5 minutes, cooling from 200° to 20° C. at a cooling rate of −20° C./minute, and keeping at 20° C. for 1 minute, and further, the 2nd RUN included heating from 20° to 200° C. at a heating rate of 20° C./minute. ΔHcc, an absolute value of a cold crystallization enthalpy of a polylactic acid resin observed in 1st RUN, and ΔHm, a melt crystallization enthalpy observed in 2nd RUN, were obtained, and from the found values a relative crystallinity (%) was calculated by the following formula:

Relative Crystallinity(%)={(ΔHm−ΔHcc)/ΔHm}×100

Test Example 3-2

Evaluation of Transparency

Parts of the sheet in an amorphous state and the biaxially stretched film were cut out, and Haze values were measured using a spectrophotometric transmittance meter with an integrating sphere, a haze meter, Model HM-150, manufactured by MURAKAMI COLOR RESEARCH LABORATORY CO., Ltd., as prescribed in JIS-K7105, and used as indexes for transparency. The smaller the values of Haze value, the more excellent the transparency.

Test Example 3-3

Evaluation of Bleeding Resistance

The biaxially stretched film was allowed to stand for one week in a thermostat kept at 70° C., and the presence or absence of bleed-out of the plasticizer on the surface was visually observed. The bleeding resistance was evaluated in the following 3 ranks by visual examination and hand feel:
3: No bleeding is found.
2: Slight bleeding is found.
1: Evident bleeding is found.

Test Example 3-4

Evaluation of Film Strength—Stress at Break

A tensile test was conducted using the biaxially stretched film to examine film strength, including stress at break, MPa. The tensile test was conducted as prescribed in JIS K 7127 with an autograph AGS-X, 1 kN, manufactured by Shimadzu Corporation. Here, it is judged that the greater the numerical values of stress at break, the more excellent the stretching orientation, and the higher the film strength.

TABLE 9

|  |  | Examples | | | | | | | Comparative Examples | | | | |
|---|---|---|---|---|---|---|---|---|---|---|---|---|---|
|  |  | 1 | 2 | 3 | 4 | 5 | 6 | 7 | 1 | 2 | 3 | 4 | 5 |
| Polyester Resin | NW 4032D | 100 | 100 | 100 | 100 | 100 | 100 | 100 | 100 | 100 | 100 | 100 | 100 |
| Plasticizer | Production Example 1 | 10 | — | — | — | — | — | — | — | — | — | — | — |
|  | Production Example 2 | — | 10 | — | — | — | — | — | — | — | — | — | — |
|  | Production Example 3 | — | — | 10 | — | — | — | — | — | — | — | — | — |
|  | Production Example 4 | — | — | — | 10 | — | — | — | — | — | — | — | — |
|  | Production Example 5 | — | — | — | — | 10 | — | — | — | — | — | — | — |
|  | Production Example 6 | — | — | — | — | — | 10 | — | — | — | — | — | — |
|  | Production Example 7 | — | — | — | — | — | — | 10 | — | — | — | — | — |
|  | Production Example 8 | — | — | — | — | — | — | — | 10 | — | — | — | — |
|  | Production Example 9 | — | — | — | — | — | — | — | — | 10 | — | — | — |
|  | POEM G-048 | — | — | — | — | — | — | — | — | — | 10 | 5 | — |
|  | POEM G-0021 | — | — | — | — | — | — | — | — | — | — | 5 | — |
| Polyester Resin Composition | Glass Transition Temp., Tg, °C. | 44 | 46 | 44 | 46 | 47 | 43 | 42 | 44 | 43 | 44 | 46 | 58 |
|  | Cold Crystallization Temp., Tc, °C. | 78 | 79 | 79 | 81 | 82 | 77 | 77 | 77 | 76 | 79 | 81 | 90 to 110 |
|  | Melting Point, Tm, °C. | 162 | 162 | 162 | 162 | 162 | 162 | 161 | 161 | 162 | 160 | 160 | 164 |
| Sheet in Amorphous State or Semi-Crystalline State | Relative Crystallinity, % | 52 | 53 | 51 | 51 | 53 | 55 | 51 | 58 | 55 | 51 | 52 | 3 |
|  | Transparency, Haze % | 1.3 | 1.3 | 1.2 | 1.2 | 1.2 | 1.5 | 1.2 | 1.3 | 1.5 | 3.8 | 4.0 | 1.2 |
| Biaxially Stretched Film | Relative Crystallinity, % | 100 | 100 | 100 | 100 | 100 | 100 | 100 | 78 | 83 | 86 | 85 | 67 |
|  | Transparency, Haze % | 2.3 | 2.0 | 1.8 | 2.1 | 1.8 | 2.3 | 2.5 | 6.8 | 7.2 | 5.2 | 5.8 | 2.5 |
|  | Bleeding Resistance | 3 | 3 | 3 | 3 | 3 | 3 | 3 | 1 | 1 | 1 | 2 | 3 |
|  | Stress at Break, MPa | 123 | 125 | 125 | 126 | 128 | 123 | 120 | 89 | 92 | 85 | 89 | 70 |

\* The amounts of the raw materials are expressed in parts by weight.
\*\* No. of Examples and Comparative Examples mean Examples 3-1 to 3-7, and Comparative Examples 3-1 to 3-5.

TABLE 10

|  |  | Example | | |
|---|---|---|---|---|
|  |  | 8 | 9 | 10 |
| Polyester Resin | NW 4032D | 100 | 100 | — |
|  | PET | — | — | 100 |
| Plasticizer | Production Example 10 | 10 | — | — |
|  | Production Example 11 | — | 10 | — |
|  | Production Example 1 | — | — | 10 |
| Polyester Resin Composition | Glass Transition Temp., Tg, °C. | 44 | 59 | 44 |
|  | Cold Crystallization Temp., Tc, °C. | 78 | 89 | 79 |
|  | Melting Point, Tm, °C. | 162 | 162 | 162 |
| Sheet in Amorphous State or Semi-Crystalline State | Relative Crystallinity, % | 52 | 53 | 51 |
|  | Transparency, Haze % | 1.3 | 1.3 | 1.5 |
| Biaxially Stretched Film | Relative Crystallinity, % | 100 | 100 | 100 |
|  | Transparency, Haze % | 2.3 | 2.0 | 2.8 |
|  | Bleeding Resistance | 3 | 3 | 3 |
|  | Stress at Break, MPa | 123 | 125 | 120 |

\* The amounts of the raw materials are expressed in parts by weight.
\*\* No. of Examples mean Examples 3-8 to 3-10.

As is clear from the results of Tables 9 and 10, the plasticizers represented by the formula (I) had excellent compatibility with the polylactic acid resin and the polyethylene terephthalate, so that the stretched films of the present invention showed a high crystallinity and excellent transparency and also had excellent bleeding resistance. Further, since the stretchability of the polylactic acid resins remarkably improved by the inclusion of the plasticizers mentioned above, the stretched films showed high stress at break and excellent film strength. On the other hand, the plasticizers used in Comparative Examples 3-3 and 3-4 had worsened compatibility with the resin, so that the stretched films had worsened transparency as compared to the inventive products, and bleed-out was found during storage and further stress at break was low. In addition, Comparative Example 3-5 not containing a plasticizer had worsened stretchability, so that improvement in stress at break was small, and had worsened film strength. The plasticizers used in Comparative Examples 3-1 and 3-2 had insufficient compatibility with the resin, so that the transparency was lowered, and bleed-out during storage was observed.

INDUSTRIAL APPLICABILITY

The sheet or film of the present invention has excellent transparency, and excellent heat resistance and bleeding resistance, so that the sheet of film can be suitably used in various industrial applications in foods, agriculture, and industries. Since the thermoformed article of the present invention has excellent transparency, heat resistance, and bleeding resistance, and further excellent rigidity, the thermoformed article can be suitably used in various applications such as food containers, wrapping materials for daily sundries and household electric appliances, and industrial trays of industrial parts. Since the stretched film of the present invention has excellent transparency and bleeding resistance, and further excellent film strength, the stretched film can be suitably used in various applications such as wrapping materials for food wrappings, daily sundries, and household electric appliances, and various industrial films.

The invention claimed is:

1. A molded article selected from the group consisting of (1) a sheet or a film, (2) a thermoformed article, (3) a stretched film, wherein the molded article is made of a polyester resin composition comprising a polyester resin and a polyester-based plasticizer represented by the following formula (I):

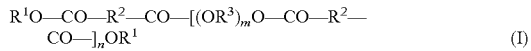
(I)

wherein $R^1$ is an alkyl group having from 1 to 4 carbon atoms, $R^2$ is an alkylene group having from 2 to 4 carbon atoms, $R^3$ is an alkylene group having from 2 to 6 carbon atoms, m is the number of from 1 to 6, and n is the number of from 1 to 12, with proviso that all the $R^2$'s may be identical or different, and that all the $R^3$'s may be identical or different.

2. The molded article according to claim 1, wherein the polyester-based plasticizer has an acid value of 1.00 mgKOH/g or less, a hydroxyl value of 10.0 mgKOH/g or less, and a number-average molecular weight of from 500 to 1,500.

3. The molded article according to claim 1, wherein the solubility parameter according to Fedors method of the polyester-based plasticizer is from 10.0 to 12.0.

4. The molded article according to claim 1, wherein the polyester-based plasticizer is obtained by using the following (1) to (3):
   (1) a monohydric alcohol having an alkyl group having from 1 to 4 carbon atoms;
   (2) a dicarboxylic acid having an alkylene group having from 2 to 4 carbon atoms; and
   (3) a dihydric alcohol having an alkylene group having from 2 to 6 carbon atoms.

5. The molded article according claim 1, wherein the polyester resin comprises a polylactic acid resin.

6. The molded article according to claim 5, wherein the content of the polylactic acid resin is 80% by weight or more of the polyester resin.

7. The molded article according to claim 1, wherein the content of the polyester resin is 70% by weight or more of the polyester resin composition.

8. The molded article according to claim 1, wherein the content of the compound represented by the formula (I) is 1 part by weight or more and 30 parts by weight or less, based on 100 parts by weight of the polyester resin.

9. The molded article according to claim 1, further comprising an organic crystal nucleating agent.

10. The molded article according to claim 9, wherein the organic crystal nucleating agent comprises a carboxylic acid amide.

11. The molded article according to claim 10, wherein the carboxylic acid amide comprises an alkylenebis hydroxystearamide having an alkylene group having from 1 to 6 carbon atoms.

12. The molded article according to claim 1, wherein $R^2$ in the formula (I) is an ethylene group.

13. The molded article according to claim 1, wherein n in the formula (I) is 2 or more.

14. The molded article according to claim 1, wherein n in the formula (I) is from 2 to 8.

15. The molded article according to claim 1, wherein $R^3$ in the formula (I) is an alkylene group having from 2 to 3 carbon atoms.

16. The molded article according to claim 1, wherein m in the formula (I) is from 1 to 3.

17. A method for producing a molded article as defined in claim 1, comprising the following step (1):
   step (1): cooling a sheet or a film obtained by extruding a polyester resin composition comprising a polyester resin and a polyester-based plasticizer represented by the formula (I) from a die according to an extrusion molding method to a temperature lower than a glass transition temperature (Tg) of the polyester resin composition, to provide a sheet or a film having a relative crystallinity of less than 80%.

18. The method for producing a molded article according to claim 17, further comprising the following step (2-1):
   step (2-1): heating a sheet or a film obtained in the step (1) to a temperature of equal to or higher than a glass transition temperature (Tg) of the polyester resin composition and lower than a melting point (Tm) of the polyester resin composition, to provide a crystallized sheet or film having a relative crystallinity of 80% or more.

19. The method for producing a molded article according to claim 17, further comprising the following step (2-2):
   step (2-2): thermoforming a sheet obtained in the step (1) within a temperature range of equal to or higher than a glass transition temperature (Tg) of the polyester resin composition and lower than a melting point (Tm) of the polyester resin composition, to provide a crystallized thermoformed article having a relative crystallinity of 80% or more.

20. The method for producing a molded article according to claim 17, further comprising the following step (2-3):
   step (2-3): subjecting a sheet obtained in the step (1) to uniaxial stretching or biaxial stretching within a temperature range of equal to or higher than a glass transition temperature (Tg) of the polyester resin composition and equal to or lower than a cold crystallization temperature (Tc) of the polyester resin composition, to provide a crystallized stretched film having a relative crystallinity of 80% or more.

* * * * *